(12) United States Patent
Ishiyama et al.

(10) Patent No.: US 11,933,987 B2
(45) Date of Patent: Mar. 19, 2024

(54) OPTICAL FILTER, OPTICAL DEVICE, AND HEAD-MOUNTED DISPLAY

(71) Applicant: FUJIFILM Corporation, Tokyo (JP)

(72) Inventors: Jun Ishiyama, Kanagawa (JP); Fumitake Mitobe, Kanagawa (JP); Yujiro Yanai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 17/696,416

(22) Filed: Mar. 16, 2022

(65) Prior Publication Data

US 2022/0206302 A1    Jun. 30, 2022

Related U.S. Application Data

(63) Continuation of application No. PCT/JP2020/032839, filed on Aug. 31, 2020.

(30) Foreign Application Priority Data

Sep. 20, 2019   (JP) .................... 2019-171376

(51) Int. Cl.
| | |
|---|---|
| *G02B 27/01* | (2006.01) |
| *G02F 1/1335* | (2006.01) |
| *G02F 1/13363* | (2006.01) |

(52) U.S. Cl.
CPC ... *G02B 27/0172* (2013.01); *G02F 1/133509* (2013.01); *G02F 1/133638* (2021.01); *G02B 2027/0178* (2013.01)

(58) Field of Classification Search
CPC ........ G02B 27/0172; G02B 2027/0178; G02F 1/133509; G02F 1/133638

(Continued)

(56) References Cited

U.S. PATENT DOCUMENTS

| | | | |
|---|---|---|---|
| 2010/0092784 A1 | 4/2010 | Kamada et al. | |
| 2014/0327837 A1* | 11/2014 | Osterman | H04N 23/10 349/2 |

(Continued)

FOREIGN PATENT DOCUMENTS

| | | |
|---|---|---|
| JP | 2008-165201 A | 7/2008 |
| JP | 2019-132895 A | 8/2019 |

(Continued)

OTHER PUBLICATIONS

International Search Report issued in PCT/JP2020/032839 dated Nov. 24, 2020.

(Continued)

*Primary Examiner* — Charles S Chang
(74) *Attorney, Agent, or Firm* — Edwards Neils LLC; Jean C. Edwards, Esq.

(57) ABSTRACT

Provided are an optical filter, an optical device, and a head-mounted display which have a high light transmittance in a front direction and a wide real field of view. The optical filter includes a first anisotropic absorption layer, a first retardation layer, and a second anisotropic absorption layer in this order, each of the first anisotropic absorption layer and the second anisotropic absorption layer contains a dichroic colorant, an absorption axis of the dichroic colorant is perpendicular to a main surface, and the first retardation layer has polar angle dependence of retardation that has asymmetry about a normal direction with respect to incident light hitting at least one incident surface including a normal of a layer surface of the first retardation layer.

20 Claims, 9 Drawing Sheets

(58) Field of Classification Search
USPC .................................................. 349/117–121
See application file for complete search history.

(56) References Cited

U.S. PATENT DOCUMENTS

| | | |
|---|---|---|
| 2019/0064557 A1 | 2/2019 | Yanai |
| 2019/0094626 A1 | 3/2019 | Yanai |
| 2019/0154896 A1* | 5/2019 | Yanai .................. G02B 5/3016 |

FOREIGN PATENT DOCUMENTS

| | | |
|---|---|---|
| WO | 2017/199656 A1 | 11/2017 |
| WO | 2017/208617 A1 | 12/2017 |
| WO | 2018/003380 A1 | 1/2018 |

OTHER PUBLICATIONS

Written Opinion issued in PCT/JP2020/032839 dated Nov. 24, 2020.
International Preliminary Report on Patentability completed by WIPO on Mar. 15, 2022 in connection with International Patent Application No. PCT/JP2020/032839.

* cited by examiner

OPTICAL FILTER, OPTICAL DEVICE, AND HEAD-MOUNTED DISPLAY

CROSS-REFERENCE TO RELATED APPLICATIONS

This application is a Continuation of PCT International Application No. PCT/JP2020/032839 filed on Aug. 31, 2020, which was published under PCT Article 21(2) in Japanese, and which claims priority under 35 U.S.C. § 119(a) to Japanese Patent Application No. 2019-171376 filed on Sep. 20, 2019. The above applications are hereby expressly incorporated by reference, in their entirety, into the present application.

BACKGROUND OF THE INVENTION

1. Field of the Invention

The present invention relates to an optical filter, an optical device, and a head-mounted display.

2. Description of the Related Art

An optical filter is being used which transmits the light entering from a direction perpendicular to the surface (front direction) of the optical filter while cutting off the light entering from an oblique direction tilting away from the surface. In a case where the transmittance of light entering from the oblique direction is lowered for this optical filter so that the light entering from the oblique direction is cut off, unfortunately, the transmittance of light in the front direction is also reduced.

As a solution to this problem, for example, JP2008-1652010A discloses an optical film that has a polarizing film on both surfaces of a retardation film, in which the polarizing film has at least a polarizer, and an absorption axis of the polarizer is aligned in a direction substantially perpendicular to the polarizing film surface.

The optical film described in JP2008-1652010A can reduce the transmittance of light in an oblique direction while maintaining a high light transmittance in a front direction.

Incidentally, in recent years, head-mounted displays such as augmented reality (AR) glasses that project an image overlaid on the background have appeared. The AR glasses have, for example, an image display element, a light guide plate, and a diffraction element, and has a configuration where the light guide plate guides the image light emitted by the image display element, and the guided image light is diffracted by the diffraction element and displayed as an image for a viewer to see. Because the light guide plate is transparent, the AR glasses can project an image overlaid on the background.

In such AR glasses, the external light incident from a specific oblique direction is diffracted toward the viewer by the diffraction element, which leads to a problem in that the viewer sees the external light as reflected glare. As a solution to this problem, the use of an optical filter that transmits light entering from the front direction while cutting off light entering from the oblique direction is considered to suppress the reflected glare of external light incident from a specific oblique direction. The specific oblique direction refers to oblique light in azimuth perpendicular to the pitch of the diffraction element. Although the incident angle (incident angle oblique to the main surface of the diffraction element) at which the external light is visible varies with the pitch of the diffraction element, especially, the external light that is incident at an angle of 40° to 80° with respect to the normal of the diffraction element is a problem because this light results in reflected glare and is visually recognized.

SUMMARY OF THE INVENTION

In a case where the optical filter described in JP2008-1652010A is used in AR glasses, although a high light transmittance can be maintained in the front direction, unfortunately, the field of view (real field of view) of background narrows.

An object of the present invention is to solve the above problem and to provide an optical filter, an optical device, and a head-mounted display having a high light transmittance in the front direction and a wide real field of view.

The inventors of the present invention have found that the above object can be achieved by the following configuration.

[1] An optical filter including a first anisotropic absorption layer, a first retardation layer, and a second anisotropic absorption layer in the following order,
  in which each of the first anisotropic absorption layer and the second anisotropic absorption layer contains a dichroic colorant, an absorption axis of the dichroic colorant is perpendicular to a main surface, and
  the first retardation layer has polar angle dependence of retardation that has asymmetry about a normal direction with respect to incident light hitting at least one incident surface including a normal of a layer surface of the first retardation layer.

[2] The optical film described in [1], in which the first retardation layer is a film where a main axis of a refractive index ellipsoid tilts in a thickness direction, and
  an average tilt angle of the refractive index ellipsoid is 5° to 85° with respect to a main surface of the first anisotropic absorption layer.

[3] The optical filter described in [1] or [2], further including a second retardation layer between the first retardation layer and the second anisotropic absorption layer.

[4] The optical filter described in any one of [1] to [3], in which the first retardation layer is formed of a polymerizable liquid crystal composition.

[5] The optical filter described in [4], in which the polymerizable liquid crystal composition contains a polymerizable rod-like liquid crystal compound.

[6] The optical filter described in any one of [1] to [5], in which at least one of the first anisotropic absorption layer or the second anisotropic absorption layer is obtained by vertically aligning the dichroic colorant in a liquid crystal layer containing a liquid crystal compound that is vertically aligned.

[7] The optical filter described in [6], in which an alignment state of the liquid crystal layer is fix.

[8] An optical device comprising the optical filter described in any one of [1] to [7].

[9] A head-mounted display comprising the optical filter described in any one of [1] to [7], a light guide plate, a diffraction element, and an image display element.

According to an aspect of the present invention, it is possible to provide an optical filter, an optical device, and a head-mounted display having a high light transmittance in the front direction and a wide real field of view.

DESCRIPTION OF THE PREFERRED EMBODIMENTS

Figure 1:
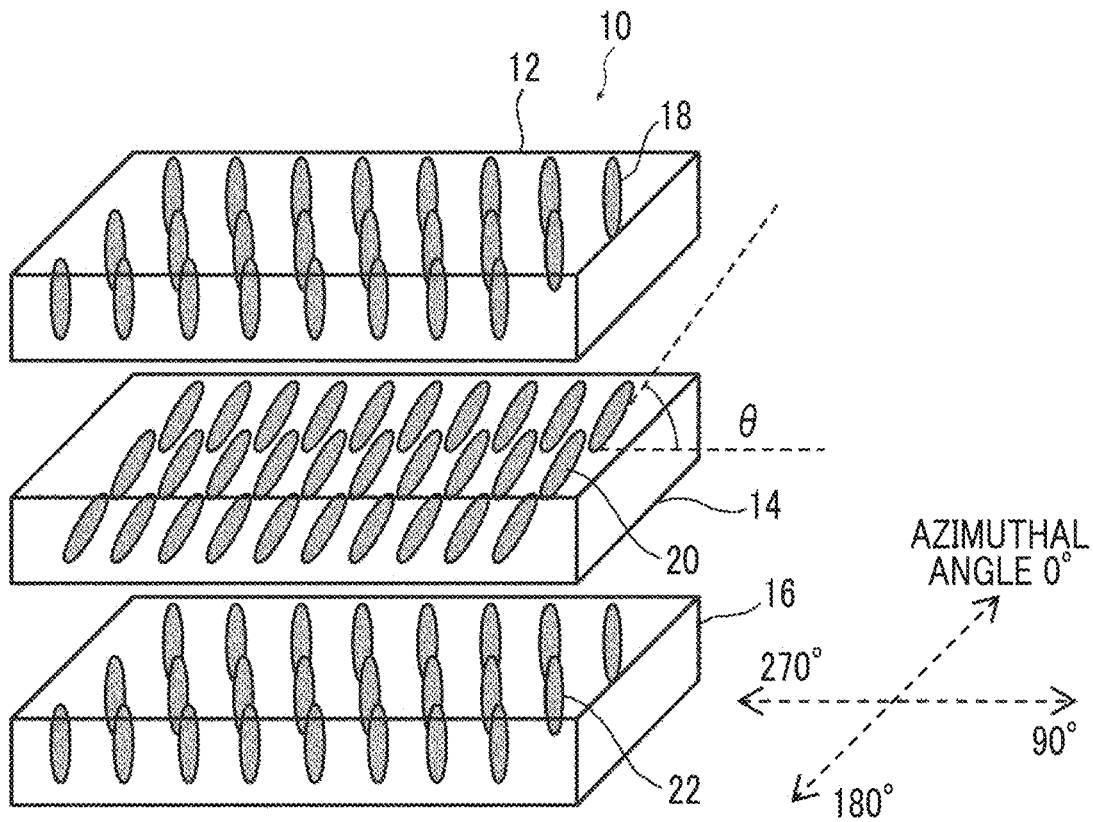
FIG. 1 is a schematic view showing an example of an optical filter according to an embodiment of the present invention.

Hereinafter, the present invention will be specifically described. In the present specification, a range of numerical values described using "to" means a range including numerical values described before and after "to" as a lower limit and an upper limit.

In the present specification, Re ($\lambda$) and Rth ($\lambda$) are an in-plane retardation (nm) at a wavelength $\lambda$ and a retardation (nm) in a thickness direction, respectively. Re ($\lambda$) is measured using AxoScan of Axometrics, Inc. by causing light having a wavelength of $\lambda$ nm to be incident on a film in a normal direction.

In a case where the film to be measured is represented by a monoaxial or biaxial refractive index ellipsoid, Rth ($\lambda$) is calculated by the following method. In selecting a measurement wavelength $\lambda$ nm, it is possible to manually change wavelength selection filters or to change the measurement wavelength by using a program or the like for measurement.

For calculating Rth ($\lambda$), on a film that has an in-plane slow axis (determined by AxoScan) as a tilt axis (rotation axis) (in a case where the film has no slow axis, any direction in the plane of the film is adopted as a rotation axis), light having a wavelength of $\lambda$ nm is caused to incident from directions tilting away from the normal direction of the film toward one side up to a tilt angle of 60°, and Re ($\lambda$) is measured at every tilt angle of 10° so that values of Re ($\lambda$) measured at a total of 7 points are obtained. Based on the measured retardation values, an assumed average refractive index, and the input film thickness, Rth ($\lambda$) is calculated by AxoScan.

In the aforementioned film having the in-plane slow axis as a rotation axis, in a case where the retardation value is zero in a certain direction at a tilt angle with respect to the normal direction, the sign of a retardation value at a tilt angle larger than such a tilt angle is changed to a negative sign, and then Rth ($\lambda$) is calculated using AxoScan.

Rth can also be determined by a method of adopting a slow axis as a tilt axis (rotation axis) (in a case where the film has no slow axis, any direction in the plane of the film is adopted as a rotation axis), measuring retardation values in any two tilt directions, and calculating Rth by the following Equations (I) and (II) based on the measured retardation values, an assumed average refractive index, and the input film thickness.

$$Re(\theta) = \left[ nx - \frac{ny \times nz}{\sqrt{\left\{ ny \, \sin\left(\sin^{-1}\left(\frac{\sin(-\theta)}{nx}\right)\right)\right\}^2 + \left\{ nz \, \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equation (I)

$$Rth = \{(nx + ny)/2 - nz\} \times d$$

Equation (II)

In the equations, Re ($\theta$) represents a retardation value in a direction tilting away from the normal direction at an angle $\theta$.

Furthermore, nx represents a refractive index in the slow axis direction in the plane, ny represents a refractive index in a direction orthogonal to nx in the plane, nz represents a refractive index in a direction orthogonal to nx and ny, and d represents a film thickness.

In a case where the film to be measured cannot be expressed as a monoaxial or biaxial refractive index ellipsoid, that is, does not have a so-called optic axis, Rth ($\lambda$) is calculated by the following method.

For calculating Rth ($\lambda$), on a film that has an in-plane slow axis (determined by AxoScan) as a tilt axis (rotation axis), light having a wavelength of $\lambda$ nm is caused to incident from directions tilting away from the normal direction of the film at angles ranging from −60° to +60°, and Re ($\lambda$) is measured at every tilt angle of 10° so that values of Re ($\lambda$) measured at 13 points are obtained. Based on the measured retardation values, an assumed average refractive index, and the input film thickness, Rth ($\lambda$) is calculated by AxoScan.

In the present invention, liquid crystal compound molecules form a tilt alignment in the first retardation layer, and the average tilt angle thereof is 5° to 85°. The tilt alignment state can be roughly classified into a hybrid alignment in which the tilt angle of the liquid crystal molecules differs between the vicinity of the upper interface and the vicinity of the lower interface, and a monoaxial tilt alignment in which the tilt angle of the liquid crystal molecules is substantially the same for the vicinity of the upper interface and the vicinity of the lower interface. In the present invention, the first retardation layer may be in any of the tilt alignment state. In the hybrid alignment, the difference in tilt angle between the vicinity of the upper interface and the vicinity of the lower interface is 5° or more. It is preferable that the tilt angle continuously change toward the lower interface from the upper interface. The mode of hybrid alignment established in a case where the first retardation layer is formed on the surface of a substrate, such as a polymer film or a glass plate, include a mode in which the tilt angle increases toward the film surface distant from the substrate from the film surface close to the substrate and a mode in which the tilt angle decreases toward the film surface distant from the substrate from the film surface close to the substrate.

In order for the optical filter to perform a function of cutting off light, in the first retardation layer, the absolute value of the average tilt angle of the liquid crystal compound molecules is preferably 5° to 85°, more preferably 10° to 80°, and even more preferably 20° to 70°.

The average tilt angle can be determined by using a crystal rotation method. In an optically anisotropic film having a hybrid alignment, the directors of liquid crystal molecules are aligned at different angles at all positions in the thickness direction of the layer. Therefore, in a case where the first retardation layer is regarded as a structure, there is no optic axis.

The first retardation layer can be prepared by forming a tilt alignment of nematic liquid crystals so that the tilt angle thereof falls into the range of the average tilt angle. As long as the above conditions are satisfied, the first retardation layer may be made of any material, and the fixing mode is not limited as well. For example, the first retardation layer can be prepared by forming a tilt alignment of low-molecular-weight liquid crystals in a liquid crystal state and then fixing the alignment by photocrosslinking or thermal crosslinking. In addition, the first retardation layer can be prepared by forming a tilt alignment of polymer liquid crystals in a liquid crystal state and then fixing the alignment by cooling.

Furthermore, the first retardation layer can also be prepared by fixing smectic liquid crystals. In a case where smectic liquid crystals are used, the first retardation layer is formed by first uniformly and horizontally aligning the smectic liquid crystals and then fixing the liquid crystals by polymerization, photocrosslinking, or thermal crosslinking so that the alignment is converted into a hybrid alignment. As a mechanism thereof, presumably, the shrinkage in space between smectic layers resulting from polymerization shrinkage may induce the distortion of focal conics, which may lead to the distortion and tilting of the smectic layers and make it possible to obtain a hybrid alignment. Therefore, it is possible to control the tilt angle by controlling the polymerization shrinkage rate and the polymerization rate. Smectic liquid crystals are less likely to cause scattering depolarization of the first retardation layer by alignment variation. Therefore, these crystals can be more preferably used in a case where a relatively large retardation, such as 100 nm or more, is required. The smectic phase is not particularly limited, and may be SmA, SmB, SmC, or a higher-order phase.

In the measurement described above, as the assumed average refractive index, it is possible to use the values listed in Polymer Handbook (JOHN WILEY & SONS, INC) and in catalogs of various optical compensation films.

In a case where the average refractive index is unknown, the average refractive index can be measured using an Abbe refractometer. For example, the average refractive indices of the main optical compensation films are as below:

Cellulose acylate (1.48), cycloolefin polymer (1.52), polycarbonate (1.59), polymethyl methacrylate (1.49), polystyrene (1.59).

By receiving the input of these assumed average refractive indices and film thickness, AxoScan calculates nx, ny, and nz. Based on the calculated nx, ny, and nz, Nz=(nx−nz)(nx−ny) is additionally calculated.

Unless otherwise specified, the wavelengths at which Re, Rth, and the refractive index are measured are values in the visible light region at λ=550 nim.

Furthermore, in the present specification, "main axis" is the main refractive index axis of the refractive index ellipsoid calculated by AxoScan. Regarding nx, ny, and nz, unless otherwise specified, nz means a main refractive index nz in the film thickness direction.

[Optical Filter]

The optical filter according to an embodiment of the present invention includes a first anisotropic absorption layer, a first retardation layer, and a second anisotropic absorption layer in this order, in which each of the first anisotropic absorption layer and the second anisotropic absorption layer contains a dichroic colorant, an absorption axis of the dichroic colorant is perpendicular to a main surface, and the first retardation layer has polar angle dependence of retardation that has asymmetry about a normal direction with respect to incidence light hitting at least one incident surface including a normal of a layer surface of the first retardation layer.

FIG. 1 is a perspective view schematically showing an example of the optical filter according to an embodiment of the present invention.

An optical filter 10 shown in FIG. 1 is configured with a first anisotropic absorption layer 12, a first retardation layer 14, and a second anisotropic absorption layer 16 that are laminated in this order. The layers shown in FIG. 1 are separated for the sake of explanation.

The first anisotropic absorption layer 12 contains a dichroic colorant 18 which has an absorption axis perpendicular to the main surface (largest surface). In the example shown in FIG. 1, the dichroic colorant 18 has a rod shape, and the major axis direction thereof acting as the absorption axis is perpendicular to the main surface.

Likewise, the second anisotropic absorption layer 16 contains a dichroic colorant 22 which has an absorption axis perpendicular to the main surface (largest surface). In the example shown in FIG. 1, the dichroic colorant 22 has a rod shape, and the major axis direction thereof acting as the absorption axis is perpendicular to the main surface.

FIG. 1 schematically illustrates the dichroic colorant 18 and the dichroic colorant 22 so as to show the alignment direction thereof.

In the first anisotropic absorption layer 12 and the second anisotropic absorption layer 16, the absorption axis of the dichroic colorant 22 is aligned in a direction substantially perpendicular to the main surface. Therefore, these layers are a film that has a high transmittance for light from the front but has a low transmittance for oblique light because the further the eyepoint is tilted, the more the film absorbs the light of longitudinal waves.

It can also be said that the absorption axes of the first anisotropic absorption layer 12 and the second anisotropic absorption layer 16 are aligned in a direction substantially perpendicular to the surface. The absorption axis of an anisotropic absorption layer means an axis parallel to a direction in which the lowest absorbance is obtained in a case where the anisotropic absorption layer is observed from all directions.

"Direction substantially perpendicular to" means that the absorption axis is aligned at an angle of 80° to 90° with respect to the polarizing film surface. The absorption axis is preferably aligned at an angle of 85° to 90°, and more preferably aligned vertically (90°). In a case where the absorption axis is at an angle less than 80° with respect to the polarizing film surface, sometimes the transmittance for light from the front is reduced.

The first retardation layer 14 is laminated between the first anisotropic absorption layer 12 and the second anisotropic absorption layer 16.

The first retardation layer 14 has polar angle dependence of retardation that has asymmetry about a normal direction (polar angle: 0°) with respect to incidence light hitting at least one incident surface including a normal of a surface on which another layer is to be laminated (hereinafter, this layer will be also called layer surface).

Specifically, in a case where R[+40°] represents a retardation measured in a direction tilting away from the normal at 40° toward the plane direction of a film at a wavelength of 550 nm in the plane (incident plane) including the in-plane slow axis or fast axis of the first retardation layer 14, and R[−40°] represents a retardation measured in a direction tilting away from the normal at 40° toward the opposite side at the same wavelength in the same plane as above, a ratio of R[+40°]/R[−40°] satisfies 1<R[+40°]/R[−40°]. It is more preferable that the ratio satisfy 1.1<R[+40°]/R[−40°]. Here, the direction of +40° and the opposite direction of −40° is determined so that R[+40°]>R[−40°] is satisfied.

Figure 2:
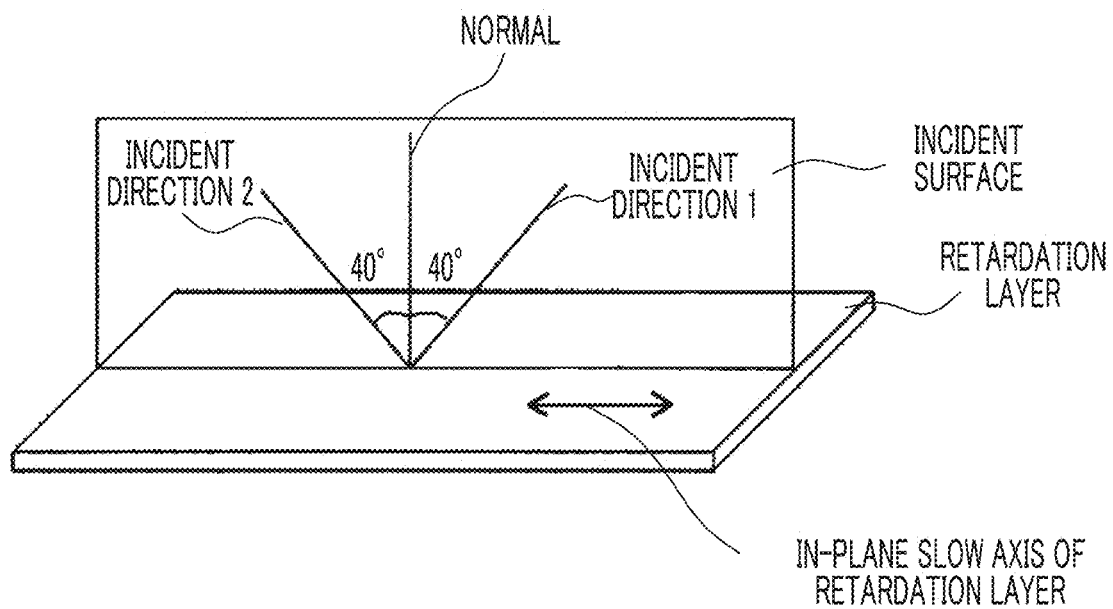
FIG. 2 is a schematic view for illustrating the definition of optical characteristics of a retardation layer.

FIG. 2 is a schematic view showing an example of the relationship between the in-plane slow axis and incident surface of the retardation layer and the incident direction in measuring R[+40°] and R[−40°]. R[+40°] and R[−40°] may be measured in any of an incident direction 1 and an incident direction 2, and are determined so that the relationship of R[+40°]>R[−40°] is satisfied. One of the examples of the first retardation layer that satisfying these characteristics is a film in which the main axis of the refractive index ellipsoid of the first retardation layer is in a direction at an average tilt angle of θt with respect to the layer surface (here, θt satisfies 0°<θt<90°), that is, a film in which the main axis tilts in the thickness direction of the layer. The average tilt angle θt preferably satisfies 5°<θt<85°, and more preferably satisfies 10°<θt≤80°.

The first retardation layer 14, which has polar angle dependence of retardation that has asymmetry about the normal direction (polar angle: 0°) with respect to incidence light hitting on at least one incident surface including the normal of the layer surface, contains, for example, a liquid crystal compound 20 as shown in FIG. 1. The first retardation layer 14 has a configuration in which the liquid crystal compound 20 is aligned so that the major axis direction of the liquid crystal compound 20 tilts at an angle θ with respect to the layer surface of the first retardation layer 14.

The azimuthal angle in the plane direction of the layer surface shown in FIG. 1 is defined as below. That is, in the example shown in FIG. 1, the major axes of the liquid crystal compound 20 are arranged in the directions of azimuthal angles of 90° and 270° and tilt to rise in the direction of 90°.

In the example shown in FIG. 1, the directions of azimuthal angles of 90° and 270° correspond to the direction of in-plane slow axis in FIG. 2, and the direction along which the major axes of the liquid crystal compound 20 are arranged (directions of 90° and 270°) corresponds to the incident surface in FIG. 2.

As shown in FIG. 1, in a case where the liquid crystal compound 20 tilts in the direction of the azimuthal angle of 90°, the incidence light in the direction tilting away from the normal at 40° toward the direction of the azimuthal angle of 90° is incident on the film from a direction close to the major axis direction of the liquid crystal compound 20. In contrast, incidence light in a direction tilting away from the normal at 40° toward the direction of an azimuthal angle of 270° is incident on the film from a direction substantially orthogonal to the major axis direction of the liquid crystal compound 20. Therefore, there is asymmetry between the retardation for the incidence light in the direction tilting away from the normal at 40° toward the direction of an azimuthal angle of 90° and the retardation for the incidence light in the direction tilting away from the normal at 40° toward the direction of an azimuthal angle of 270°.

Details of the configuration of the first retardation layer 14 will be described later.

The action of the optical filter 10 having the above configuration will be described.

In a case where light is incident on the optical filter 10 from a direction perpendicular to the main surface of the first anisotropic absorption layer 12 (this direction is also called front), the light is not absorbed into (unlikely to be absorbed into) the first anisotropic absorption layer 12 but transmitted through the first anisotropic absorption layer 12, is incident on the first retardation layer 14, obtains a phase difference, and is then transmitted through the first retardation layer 14. The light transmitted through the first retardation layer 14 is incident on the second anisotropic absorption layer 16. The second anisotropic absorption layer 16 transmits the light from the front, regardless of the polarization state of the light. Therefore, the optical filter 10 transmits the light from the front direction at a high transmittance.

Next, a case will be discussed where light is incident on the optical filter 10 from a direction tilting away from a direction perpendicular to the main surface of the first anisotropic absorption layer 12 toward the direction of an azimuthal angle of 90°.

Among the components of the light incident on the first anisotropic absorption layer 12 from the oblique direction of an azimuthal angle of 90°, the components of the directions of azimuthal angles of 90° and 270° are absorbed into the first anisotropic absorption layer 12. Therefore, the light transmitted through the first anisotropic absorption layer is converted into linearly polarized light in the directions of azimuthal angles of 0° and 180°, and is incident on the first retardation layer 14. In a case where light is incident on the first retardation layer 14 from an oblique direction of an azimuthal angle of 90°, the light is incident on the film from a direction substantially parallel to the major axis direction of the liquid crystal compound 20. Therefore, the light is transmitted through the first retardation layer 14 without experiencing change in polarization state by the first retardation layer 14, and incident on the second anisotropic absorption layer 16. In a case where light is incident on the second anisotropic absorption layer 16 from an oblique direction of an azimuthal angle of 90°, components in the directions of azimuthal angles of 90° and 270° are absorbed. However, because the incident light is linearly polarized light in the directions of azimuthal angles of 0° and 180°, the light is transmitted without being absorbed into the second anisotropic absorption layer 16. As a result, the optical filter 10 transmits light from an oblique direction of an azimuthal angle of 90° at a high transmittance.

Next, a case will be discussed where light is incident on the optical filter 10 from a direction tilting away from a direction perpendicular to the main surface of the first anisotropic absorption layer 12 toward the direction of an azimuthal angle of 270°.

Among the components of the light incident on the first anisotropic absorption layer 12 from the oblique direction of an azimuthal angle of 270°, the components in the directions of azimuthal angles of 90° and 270° are absorbed into the first anisotropic absorption layer 12. Therefore, the light transmitted through the first anisotropic absorption layer is converted into linearly polarized light in the directions of azimuthal angles of 0° and 180°, and is incident on the first retardation layer 14. In a case where light is incident on the first retardation layer 14 from an oblique direction of an azimuthal angle of 270°, the incident light enters the film from a direction substantially orthogonal to the major axis direction of the liquid crystal compound 20, and the polarization direction of the incident light is substantially orthogonal to the major axis direction (slow axis direction) of the liquid crystal compound 20. Therefore, the polarization state is not changed by the first retardation layer 14, and the incident light remains as linearly polarized light in the directions of azimuthal angles of 0° and 180°, is transmitted through the first retardation layer 14 as it is, and incident on the second anisotropic absorption layer 16. In a case where light is incident on the second anisotropic absorption layer 16 from an oblique direction of an azimuthal angle of 270°, components in the directions of azimuthal angles of 90° and 270° are absorbed. However, because the incident light is linearly polarized light in the directions of azimuthal angles of 0° and 180°, the light is transmitted without being absorbed into the second anisotropic absorption layer 16. As a result, the optical filter 10 transmits light from an oblique direction of an azimuthal angle of 270° at a high transmittance.

Next, a case will be discussed where light is incident on the optical filter 10 from a direction tilting away from a direction perpendicular to the main surface of the first anisotropic absorption layer 12 toward the direction of an azimuthal angle of 0°. Basically, the same phenomenon as follows occurs in a case where light is incident in a direction of an azimuthal angle of 180°.

Among the components of the light incident on the first anisotropic absorption layer 12 from the oblique direction of an azimuthal angle of 0°, the components of the directions of azimuthal angles of 0° and 180° are absorbed into the first anisotropic absorption layer 12. Therefore, the light transmitted through the first anisotropic absorption layer is converted into linearly polarized light in the directions of azimuthal angles of 90° and 270°, and is incident on the first retardation layer 14. In a case where light is incident on the first retardation layer 14 from an oblique direction of an azimuthal angle of 0°, the polarization direction of the incident light intersects with the major axis direction (slow axis direction) of the liquid crystal compound 20. For example, in a case where the polarization direction of the incident light and the major axis direction (slow axis direction) of the liquid crystal compound 20 intersect at 45°, and retardation corresponds to λ/2 of the wavelength of the incident light, the linearly polarized light in directions of azimuthal angles of 90° and 270° experiences change in polarization state by the first retardation layer 14, is converted into linearly polarized light in directions of 0° and 180°, and is transmitted through the first retardation layer 14. The light transmitted through the first retardation layer 14 is incident on the second anisotropic absorption layer 16. In a case where light is incident on the second anisotropic absorption layer 16 from an oblique direction of an azimuthal angle of 0°, components in directions of azimuthal angles of 0° and 180° are absorbed. Because the incident light is linearly polarized light in directions of azimuthal angles of 0° and 180°, the light is absorbed into the second anisotropic absorption layer 16. Therefore, the optical filter 10 cuts off the light from an oblique direction of an azimuthal angle of 0° (light transmittance is reduced). Likewise, the optical filter 10 cuts off the light from an oblique direction of an azimuthal angle of 180° (light transmittance is reduced).

Hitherto, a case has been described where the polarization direction of the light incident on the first retardation layer 14 and the major axis direction (slow axis direction) of the liquid crystal compound 20 intersect at 45°, and retardation corresponds to λ/2 of the wavelength of the incident light. However, the present invention is not limited thereto. In a case where the polarization direction of the light incident on the first retardation layer 14 and the major axis direction (slow axis direction) of the liquid crystal compound 20 intersect at an angle that is not 45°, or the retardation does not correspond to λ/2 of the wavelength of the incident light, the polarized light incident on the first retardation layer 14 is converted into circularly polarized light and incident on the second anisotropic absorption layer 16. In a case where light is incident on the second anisotropic absorption layer 16 from an oblique direction of an azimuthal angle of 0° or 180°, the components in the directions of azimuthal angles of 0° and 180° are absorbed. Therefore, some of the components of the light incident on the second anisotropic absorption layer 16 are absorbed, which leads to the reduction of light transmittance.

As described above, the optical filter according to an embodiment of the present invention has a high light transmittance in the front direction and in two oblique directions among four azimuth directions.

The conventional configuration in which the retardation layer has polar angle dependence of retardation that has symmetry about the normal direction unlike the present invention will be described using FIG. 3. An optical filter 100 shown in FIG. 3 has a first anisotropic absorption layer 12, a retardation layer 114, and a second anisotropic absorption layer 16. The first anisotropic absorption layer 12 and the second anisotropic absorption layer 16 have the same configuration as the first anisotropic absorption layer 12 and the second anisotropic absorption layer 16 of the optical filter 10 shown in FIG. 1.

Figure 3:
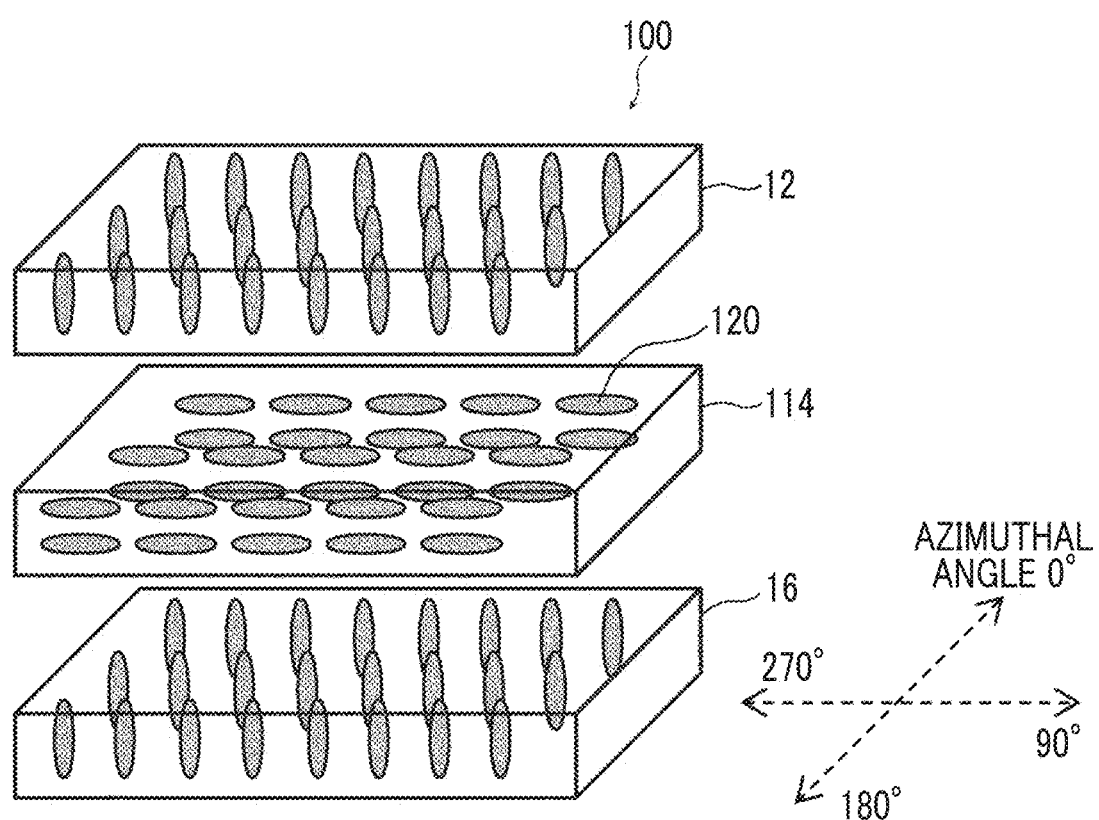
FIG. 3 is a schematic view showing an example of an optical filter in the related art.

As shown in FIG. 3, the retardation layer 114 contains a liquid crystal compound 120, and has a configuration in which the liquid crystal compound 120 is aligned so that the major axis direction of the liquid crystal compound 120 is parallel to the layer surface of the first retardation layer 14.

The action of the optical filter 100 will be described.

In a case where light is incident on the optical filter 100 from a direction perpendicular to the main surface of the first anisotropic absorption layer 12 (this direction is also called front), the light is not absorbed into (unlikely to be absorbed into) the first anisotropic absorption layer 12 but transmitted through the first anisotropic absorption layer 12, is incident on the retardation layer 114, obtains a phase difference, and is then transmitted through the retardation layer 114. The light transmitted through the retardation layer 114 is incident on the second anisotropic absorption layer 16. The second anisotropic absorption layer 16 transmits the light from the front, regardless of the polarization state of the light. Therefore, the optical filter 100 transmits the light from the front direction at a high transmittance.

Next, a case will be discussed where light is incident on the optical filter 100 from a direction tilting away from a direction perpendicular to the main surface of the first anisotropic absorption layer 12 toward the direction of an azimuthal angle of 90° (270°).

Among the components of the light incident on the first anisotropic absorption layer 12 from the oblique direction of an azimuthal angle of 90°, the components of the directions of azimuthal angles of 90° and 270° are absorbed into the first anisotropic absorption layer 12. Therefore, the light transmitted through the first anisotropic absorption layer is converted into linearly polarized light in the directions of azimuthal angles of 0° and 180°, and is incident on the first retardation layer 14. In a case where light is incident on the retardation layer 114 from an oblique direction of an azimuthal angle of 90°, the incident direction of the incident light is substantially orthogonal to the major axis direction of the liquid crystal compound 120, and the polarization direction of the incident light is substantially orthogonal to the major axis direction (slow axis direction) of the liquid crystal compound 120. Therefore, the polarization state is not changed by the retardation layer 114, and the incident light remains as linearly polarized light in the directions of azimuthal angles of 0° and 180°, is transmitted through the retardation layer 114 as it is, and is incident on the second anisotropic absorption layer 16. In a case where light is incident on the second anisotropic absorption layer 16 from an oblique direction of an azimuthal angle of 90°, components in the directions of azimuthal angles of 90° and 270° are absorbed. However, because the incident light is linearly polarized light in the directions of azimuthal angles of 0° and 180°, the light is transmitted without being absorbed into the second anisotropic absorption layer 16. As a result, the optical filter 100 transmits light from an oblique direction of an azimuthal angle of 90° (270°) at a high light transmittance.

Next, a case will be discussed where light is incident on the optical filter 100 from a direction tilting away from a direction perpendicular to the main surface of the first anisotropic absorption layer 12 toward the direction of an azimuthal angle of 0° (180°).

Among the components of the light incident on the first anisotropic absorption layer 12 from the oblique direction of an azimuthal angle of 0°, the components of the directions of azimuthal angles of 0° and 180° are absorbed into the first anisotropic absorption layer 12. Therefore, the light transmitted through the first anisotropic absorption layer is converted into linearly polarized light in the directions of azimuthal angles of 90° and 270°, and is incident on the retardation layer 114. In a case where light is incident on the retardation layer 114 from an oblique direction of an azimuthal angle of 0°, the polarization direction of the incident light is substantially parallel to the major axis direction (slow axis direction) of the liquid crystal compound 120. Therefore, the polarization state is not changed by the retardation layer 114, and the incident light remains as linearly polarized light in the directions of azimuthal angles of 90° and 270°, is transmitted through the retardation layer 114 as it is, and is incident on the second anisotropic absorption layer 16. In a case where light is incident on the second anisotropic absorption layer 16 from an oblique direction of an azimuthal angle of 0°, components in the directions of azimuthal angles of 0° and 180° are absorbed. However, because the incident light is linearly polarized light in the directions of azimuthal angles of 90° and 270°, the light is transmitted without being absorbed into the second anisotropic absorption layer 16. As a result, the optical filter 100 transmits light from an oblique direction of an azimuthal angle of 0° (180°) at a high light transmittance.

Next, a case will be discussed where light is incident on the optical filter 100 from a direction tilting away from a direction perpendicular to the main surface of the first anisotropic absorption layer 12 toward the direction of an azimuthal angle of 45° (225°).

Among the components of the light incident on the first anisotropic absorption layer 12 from the oblique direction of an azimuthal angle of 45°, the components in the directions of azimuthal angles of 45° and 225° are absorbed into the first anisotropic absorption layer 12. Therefore, the light transmitted through the first anisotropic absorption layer is converted into linearly polarized light in the directions of azimuthal angles of 135° and 315°, and is incident on the retardation layer 114. In a case where light is incident on the retardation layer 114 from an oblique direction of an azimuthal angle of 45°, the polarization direction of the incident light and the major axis direction (slow axis direction) of the liquid crystal compound 120 intersect at about 45°. Therefore, in a case where the retardation corresponds to $\lambda/2$ of the wavelength of the incident light, the linearly polarized light in directions of azimuthal angles of 135° and 315° experiences change in polarization state by the retardation layer 114, is converted into linearly polarized light in directions of 45° and 225°, and is transmitted through the retardation layer 114. The light transmitted through the retardation layer 114 is incident on the second anisotropic absorption layer 16. In a case where light is incident on the second anisotropic absorption layer 16 from an oblique direction of an azimuthal angle of 45°, components in directions of azimuthal angles of 45° and 225° are absorbed. Because the incident light is linearly polarized light in directions of azimuthal angles of 45° and 225°, the light is absorbed into the second anisotropic absorption layer 16. Therefore, the optical filter 100 cuts off the light from an oblique direction of an azimuthal angle of 45° (225°) (light transmittance is reduced).

Likewise, the optical filter 100 cuts off the light from oblique directions of azimuthal angles of 135° and 315° (light transmittance is reduced).

As described above, the optical filter of the related art shown in FIG. 3 has a high light transmittance in the front direction, but has a low light transmittance in oblique directions in four azimuth directions.

Figure 4:
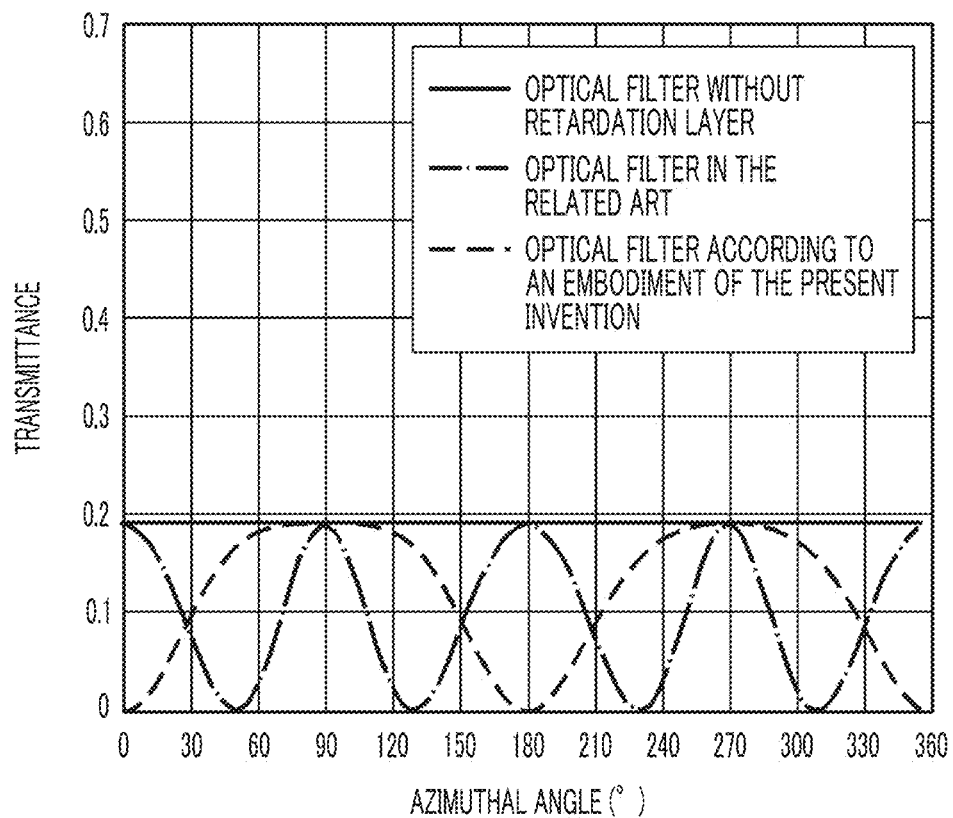
FIG. 4 is a graph showing the relationship between azimuthal angle and transmittance.

FIG. 4 is a graph schematically showing the relationship between the transmittance of light in an oblique direction at a polar angle of 60° and the azimuthal angle, which is established in the optical filter according to an embodiment of the present invention, the optical filter of the related art, and an optical filter having no retardation layer (an optical filter configured with a first anisotropic absorption layer and a second anisotropic absorption layer).

As shown in FIG. 4, in a case where an optical filter does not have a retardation layer, transmittance is 0 in none of the azimuth directions, and the light from the oblique direction cannot be cut off. Furthermore, in the optical filter of the related art, transmittance is zero in four azimuth directions. In these directions, light from an oblique direction can be cut off, but the optical filter transmits a narrow range of light from an oblique direction. On the other hand, in the optical filter according to an embodiment of the present invention, transmittance is zero in two azimuth directions. In addition, the optical filter transmits a wide range of light from an oblique direction.

As described above, the optical filter according to an embodiment of the present invention has a low transmittance in some directions with respect to light in an oblique direction but has a high transmittance in a wide range of directions with respect to light in an oblique direction. Therefore, in a case where the optical filter according to the embodiment of the present invention is used in AR glasses, a wide field of view (real field of view) can be maintained for the background.

The optical filter according to the embodiment of the present invention is not limited to the configuration consisting of the first anisotropic absorption layer 12, the first retardation layer 14, and the second anisotropic absorption layer 16, and may have other layers.

Figure 5:
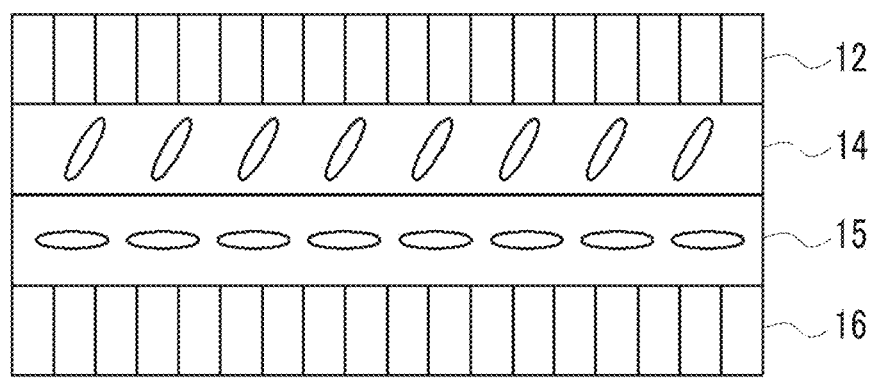
FIG. 5 is a schematic view showing another example of the optical filter according to the embodiment of the present invention.

For example, as in the example shown in FIG. 5, the optical filter may have a second retardation layer 15 between the first retardation layer 14 and the second anisotropic absorption layer 16.

The second retardation layer 15 may be a retardation layer having polar angle dependence of retardation that has asymmetry about the normal direction with respect to incident light hitting at least one incident surface including a normal of the layer surface, just as the first retardation layer 14. Alternatively, the second retardation layer 15 may be a retardation layer having polar angle dependence of retardation that has symmetry about the normal direction, just as the retardation layer 114. The second retardation layer 15 is preferably a retardation layer having symmetry.

In a case where the optical filter has the second retardation layer 15, the range of azimuth directions in which transmittance is 0 can be adjusted.

In a case where the optical filter has the second retardation layer 15, it is preferable that the slow axis direction of the second retardation layer 15 be orthogonal to the slow axis direction of the first retardation layer 14.

Furthermore, each of the layers, such as the first anisotropic absorption layer 12, the first retardation layer 14, and the second anisotropic absorption layer 16, may be directly laminated on each other or laminated via an adhesive layer or a pressure-sensitive adhesive layer.

Each of the layers, such as the first anisotropic absorption layer 12, the first retardation layer 14, and the second anisotropic absorption layer 16, of the optical filter 10 may include a substrate.

[Head-Mounted Display]

The head-mounted display according to an embodiment of the present invention comprises the aforementioned optical filter according to an embodiment of the present invention,
a light guide plate,
a diffraction element, and
an image display element.

Figure 6:
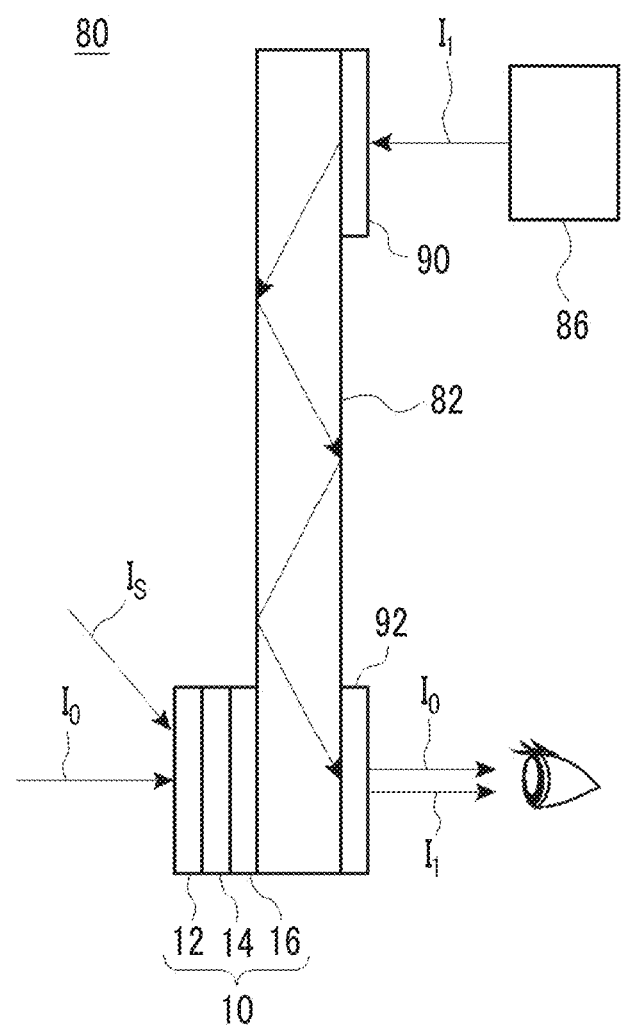
FIG. 6 is a schematic view showing an example of a head-mounted display having the optical filter according to the embodiment of the present invention.

FIG. 6 is a perspective view schematically showing an example of the head-mounted display according to an embodiment of the present invention.

A head-mounted display 80 shown in FIG. 6 has a light guide plate 82, an incident diffraction element 90, an exit diffraction element 92, an optical filter 10, and an image display element 86.

The light guide plate 82 guides the incident light on the inside thereof.

As shown in FIG. 6, the incident diffraction element 90 is disposed on a surface (main surface) of the light guide plate 82 that is on the side of one end part. Furthermore, the exit diffraction element 92 is disposed on a surface of the light guide plate 82 that is on the side of the other end part. Where the incident diffraction element 90 is disposed corresponds to the position where light is incident on the light guide plate 82, and where the exit diffraction element 92 is disposed corresponds to the position where light exits the light guide plate 82. In addition, the incident diffraction element 90 and the exit diffraction element 92 are arranged on the same surface of the light guide plate 82.

The optical filter 10 faces the exit diffraction element 92 of the light guide plate 82 and is disposed on a surface of the light guide plate 82 that is opposite to the surface on which the exit diffraction element 92 is disposed.

The light guide plate 82 is not particularly limited, and a light guide plate known in the related art that is used in an image display apparatus and the like can be used.

The incident diffraction element 90 is a diffraction element which diffracts the light emitted from the image display element 86 at an angle causing total reflection in the light guide plate 82 so that the light is incident on the light guide plate 82.

The incident diffraction element 90 is not limited, and it is possible to use various diffraction elements used in AR display devices, such as a relief-type diffraction element, a diffraction element formed of liquid crystals, and a volume holographic diffraction element.

As shown in FIG. 6, the image display element 86 is disposed so as to face the incident diffraction element 90. What the user sees is the surface side on which the exit diffraction element 92 is disposed.

The image display element 86 is not limited, and for example, it is possible to use various known displays used in AR display devices, such as AR glasses.

Examples of the image display element 86 include a liquid crystal display (including Liquid Crystal On Silicon (LCOS) or the like), an organic electroluminescent display, (Digital Light Processing (DLP), a Micro-Electro-Mechanical Systems (MEMS)-type display, a micro LED display, and the like.

The image display element 86 may display a monochromatic image, a dichromatic image, or a color image.

The exit diffraction element 92 is a diffraction element which diffracts the light guided in the light guide plate 82 and causes the light to exit the light guide plate 82.

The exit diffraction element 92 is not limited, and it is possible to use various diffraction elements used in AR display devices, such as a relief-type diffraction element, a diffraction element formed of liquid crystals, and a volume holographic diffraction element.

In the head-mounted display 80 having the above a configuration, light $I_1$ displayed on the image display element 86 is diffracted by the incident diffraction element 90 and incident on the light guide plate 82 as indicated by the arrows. Because the light incident on the light guide plate 82 is diffracted at an angle greatly different from the angle of incident light, the light travels at a smaller angle with respect to the surface of the light guide plate 82. Therefore, the light is totally reflected from both surfaces of the light guide plate 82 and guided in the light guide plate 82 in the longitudinal direction.

The light guided in the light guide plate 82 is incident on the exit diffraction element 92 at the other end part of the light guide plate 82 in the longitudinal direction. In this case, as shown in FIG. 6, the light is incident on the exit diffraction element 92 from an oblique direction and is diffracted in a direction perpendicular to the surface of the exit diffraction element 92.

The light diffracted by the exit diffraction element 92 exits the light guide plate 82. That is, the light exits toward the position that the user sees.

Furthermore, as shown in FIG. 6, external light (hereinafter, also called front light) $I_0$ incident on the head-mounted display 80 from the front direction is transmitted through the optical filter 10, incident on the light guide plate 82, is transmitted through the exit diffraction element 92, and reaches the position that the user sees.

As described so far, in the head-mounted display 80, the image displayed on the image display element 86 is transmitted by being incident on one end of the light guide plate 82 and exits the other end thereof. In this way, a virtual image is displayed by being overlaid on the scene that the user is actually watching.

Figure 7:
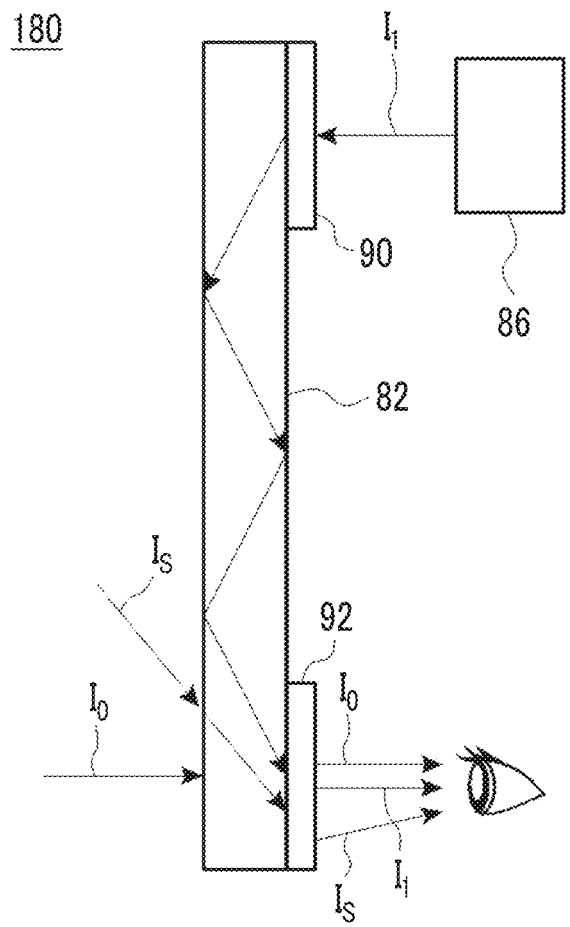
FIG. 7 is a schematic view showing an example of a head-mounted display in the related art.

As shown in FIG. 7, in a case where light (hereinafter, also called oblique light) $I_s$ is incident on a head-mounted display 180 without the optical filter 10 from an oblique direction, the oblique light $I_s$ is diffracted by the exit diffraction element 92, which leads to the problem of reflected glare. Particularly, sunlight and the light in a specific direction, such as illumination light, are likely to cause the problem of reflected glare that is highly visible.

Regarding this problem, it is considered that the reflected glare resulting from the oblique light $I_s$ may be suppressed by disposing the optical filter of the related art shown in FIG. 3 in the light guide plate so that the front light $I_0$ is transmitted while the oblique light $I_s$ is cut off.

However, as described above, in the optical filter of the related art, transmittance is 0 in four azimuth directions, which means that the optical filter transmits a narrow range of light from oblique directions. Therefore, in a case where such an optical filter is used in the head-mounted display 180, the oblique light from various directions is cut off, which leads to the problem in that the field of view of background (real field of view) is narrowed.

On the other hand, as described above, in the optical filter 10 according to an embodiment of the present invention, the transmittance in the oblique direction is low in two directions, and the range of directions along which high transmittance is exhibited in oblique directions is wide. Therefore, in a case where the optical filter 10 is disposed in the head-mounted display 80 so that the light transmittance is reduced in the incident direction of the oblique light $I_s$, it is possible to suppress the reflected glare resulting from the oblique light $I_s$ by cutting off the oblique light $I_s$, and to maintain a wide field of view (real field of view) for background by allowing light in other directions to be transmitted.

In the example shown in FIG. 6, the optical filter 10 is disposed so that the directions of 0° and 180° in the azimuth directions shown in FIG. 1 are aligned with the vertical direction in FIG. 6. As a result, it is possible to suppress reflected glare resulting from sunlight obliquely incident on the optical filter from above or resulting from strong external light such as illumination light, and to widen the real field of view in the horizontal direction (direction perpendicular to the paper surface of FIG. 6).

In the example shown in FIG. 6, each of the incident diffraction element 90 and the exit diffraction element 92 is a transmission-type diffraction element. However, these elements are not limited thereto, and may be a reflective type diffraction element. In a case where the elements 90 and 92 are a reflective type diffraction element, the incident diffraction element 90 is disposed on a surface of the light guide plate 82 that is opposite to the surface facing the image display element 86. Furthermore, the exit diffraction element 92 is disposed on a surface of the light guide plate 82 that is opposite to the surface facing the user. In addition, in this case, the optical filter 10 may be disposed on a surface of the exit diffraction element 92 that is opposite to the user side.

Hereinafter, each constituent will be specifically described.

<Anisotropic Absorption Layer>

Each of the first anisotropic absorption layer 12 and the second anisotropic absorption layer 16 contains a dichroic colorant, and the absorption axis of the dichroic colorant is perpendicular to the main surface. Basically, the first anisotropic absorption layer 12 and the second anisotropic absorption layer 16 have the same configuration. Therefore, in the following description, unless the first anisotropic absorption layer 12 and the second anisotropic absorption layer 16 need to be distinguished, these layers will be collectively called anisotropic absorption layer as well.

In a case where the absorption axis of the anisotropic absorption layer is aligned in a direction substantially perpendicular to the main surface, a high transmittance is exhibited in the front direction, and a low transmittance is exhibited in the oblique direction because only the light of transverse waves is transmitted in this direction.

Whether the absorption axis of the anisotropic absorption layer is aligned in a direction substantially perpendicular to the horizontal reference surface (main surface) can be checked by observing the cross section of the anisotropic absorption layer with a transmission electron microscope (TEM).

As shown in FIG. 1, in the anisotropic absorption layer, the absorption axis of the dichroic colorant is aligned in a direction perpendicular (approximately at 90°) to the main surface.

As a technique of aligning the dichroic colorant as desired, it is possible to refer to a technique of preparing a polarizer by using a dichroic colorant, a technique of preparing a guest-host liquid crystal cell, and the like. For example, the techniques used in the method for preparing a dichroic polarizing element described in JP2002-90526A and the method for preparing a guest-host liquid crystal display device described in JP2002-99388A can also be used for preparing the anisotropic absorption layer used in the present invention.

Dichroic colorants can be classified into a dichroic colorant having rod-like molecules and a dichroic colorant having discotic molecules. Any of these may be used for preparing the anisotropic absorption layer used in the present invention. Preferable examples of the dichroic colorant having rod-like molecules include an azo colorant, an anthraquinone colorant, a perylene colorant, a merocyanine colorant, and the like. Examples of the azo colorant include those exemplified in JP1999-172252A (JP-H11-172252A). Examples of the anthraquinone colorant include those exemplified in JP1996-67822A (JP-H08-67822A). Examples of the perylene colorant include those exemplified in JP1987-129380A (JP-S62-129380A). Examples of the merocyanine colorant include those exemplified in JP2002-241758A. One kind of each of these colorants may be used alone, or two or more kinds of these colorants may be used in combination.

Examples of the dichroic colorant having discotic molecules include lyotropic liquid crystals represented by OPTIVA Inc. As such liquid crystals, those used as "E-Type polarizer" are known. Examples thereof include the materials described in JP2002-90547A. In addition, for example, a bisazo-based dichroic colorant is used which uses a threadlike micelle structure as a chemical structure that absorbs light in a disk shape. Examples thereof include the materials described in JP2002-90526A. One kind of each of these colorants may be used alone, or two or more kinds of these colorants may be used in combination.

In the present invention, it is preferable to use a rod-like dichroic colorant.

For example, by using the technique of guest-host liquid crystal cell, it is possible to incorporate the molecules of a dichroic colorant into the alignment of host liquid crystals and to form a desired alignment as described above. Specifically, it is possible to prepare the anisotropic absorption layer used in the present invention by mixing a dichroic colorant as a guest with a rod-like liquid crystal compound as host liquid crystals, aligning the host liquid crystals together with the molecules of the dichroic colorant along the alignment of the host liquid crystal molecules, and fixing the alignment state.

In order to prevent the light absorption characteristics of the anisotropic absorption layer used in the present invention from changing with the usage environment, it is preferable to fix the alignment of the dichroic colorant by forming a chemical bond. For example, it is possible to fix the alignment by polymerizing the host liquid crystals, the dichroic colorant, or a polymerizable component that is added as desired.

Furthermore, a guest-host liquid crystal cell that includes a pair of substrates with a liquid crystal layer containing at least a dichroic colorant and host liquid crystals may be used as the anisotropic absorption layer used in the present invention. The alignment of the host liquid crystals (and the alignment of the dichroic colorant molecules incorporated into the alignment of the host liquid crystals) can be controlled by the alignment film formed on the inner surface of the substrate. Unless an external stimulus such as an electric field is applied thereto, the alignment state is maintained, and the anisotropic absorption layer used in the present invention can exhibit constant light absorption characteristics.

Furthermore, by causing a dichroic colorant to permeate a polymer film and aligning the dichroic colorant along the alignment of polymer molecules in the polymer film, it is possible to prepare a polymer film satisfying the light absorption characteristics required for the anisotropic absorption layer used in the present invention. Specifically, such a polymer film can be prepared by coating the surface of a polymer film with a solution of dichroic colorant and causing the solution to permeate the film. The alignment of the dichroic colorant can be adjusted by the alignment of polymer chains in the polymer film, the properties thereof (chemical and physical properties of the polymer chains, functional groups of the polymer chains, and the like), the coating method, and the like. Details of this method are described in JP2002-90526A.

In the present invention, a dichroic colorant is defined as a compound having a function of absorbing light. Although the absorption maximum and absorption band of the dichroic colorant are not limited, it is preferable that the dichroic colorant have absorption maximum in a yellow region (Y), a magenta region (M), or a cyan region (C). Furthermore, two or more kinds of dichroic colorants may be used. It is preferable to use a mixture of dichroic colorants having absorption maximums in Y, M, and C. It is more preferable to mix and use dichroic colorants together so that the mixture absorbs the light in the entire visible range (400 to 750 nm). Here, the yellow region is a range of 430 to 500 nm, the magenta region is a range of 500 to 600 nm, and the cyan region is a range of 600 to 750 nm.

The thickness of the anisotropic absorption layer is preferably 0.1 μm to 10 μm, more preferably 0.3 μm to 5 μm, and even more preferably 0.5 μm to 3 μm.

In a case where the anisotropic absorption layer is thin, the diffracted light resulting from oblique incidence is not fully cut off. In a case where the anisotropic absorption layer is thick, the transmittance of external light in the front direction is reduced.

—Manufacturing Method of Anisotropic Absorption Layer—

The manufacturing method of the anisotropic absorption layer is not particularly limited as long as major axes of a dichroic colorant can be aligned in a direction perpendicular to the substrate surface (horizontal plane). The manufacturing method can be appropriately selected depending on the purpose. Examples of the manufacturing method include (1) guest-host liquid crystal method, (2) anodic alumina method, and the like.

The guest-host liquid crystal method as the method (1) is a method of coating a substrate having an alignment film on a surface thereof with a coating liquid for an absorption layer containing at least an ultraviolet-curable liquid crystal compound and a dichroic colorant, drying the solution to form a coating layer, heating the coating layer up to a temperature at which a liquid crystal phase appears, and irradiating the heated coating layer with ultraviolet rays so as to form an anisotropic absorption layer in which major axes of the dichroic colorant are aligned in a direction substantially perpendicular to the substrate surface.

<First Retardation Layer>

The first retardation layer has polar angle dependence of retardation that has asymmetry about the normal direction (polar angle 0°) with respect to incident light hitting at least one incident surface including a normal of the layer surface of the first retardation layer.

The first retardation layer is preferably formed of a polymerizable liquid crystal composition containing a polymerizable liquid crystal compound.

The liquid crystal compound may be a rod-like liquid crystal compound or a discotic liquid crystal compound. In the present invention, it is preferable to use a rod-like liquid crystal compound.

The first retardation layer formed of the polymerizable liquid crystal composition is formed by forming a desired alignment state by using the polymerizable liquid crystal composition and then curing the composition. For example, the first retardation layer can be prepared by coating an alignment treatment surface of an alignment film with the polymerizable liquid crystal composition, aligning liquid crystals along the direction of the alignment treatment, and fixing the alignment state.

Examples of the alignment film include a rubbing treatment film as a layer containing an organic compound such as a polymer, an obliquely deposited film formed of an inorganic compound, a film having microgrooves, a film obtained by layering Langmuir-Blodgett (LB) films prepared by the Langmuir-Blodgett method by using organic compounds such as w-tricosanoic acid, dioctadecylmethylammonium chloride, and methyl stearate, and the like. Examples thereof include an alignment film that exhibits an alignment function by irradiation with light.

As the alignment film, it is possible to preferably use a film formed by performing a rubbing treatment on the surface of a layer (polymer layer) containing an organic compound such as a polymer. The rubbing treatment is carried out by rubbing the surface of a polymer layer with paper or cloth several times in a certain direction (preferably in the longitudinal direction of a support). As polymers used for forming the alignment film, it is preferable to use polyimide, polyvinyl alcohol, the modified polyvinyl alcohol described in paragraphs [0071] to [0095] of JP3907735B, the polymer having a polymerizable group described in JP1997-152509A (JP-1109-152509A), and the like.

An aspect is also preferable where so-called photo-alignment film (photo-alignment layer) is used which is obtained by irradiating a photo-aligning material with polarized or non-polarized light.

In the present invention, it is preferable to add anchoring force by a step of irradiating a photo-alignment film with polarized light from an oblique direction or a step of irradiating a photo-alignment film with non-polarized light from an oblique direction.

The thickness of the alignment film is not particularly limited as long as the film can exhibit the alignment function. The thickness of the alignment film is preferably 0.01 to 5 µm, and more preferably 0.05 to 2 sm.

Examples of the photo-alignment material used for the photo-alignment film include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, the aromatic ester compounds described in JP2002-229039A, the maleimide and/or alkenyl-substituted nadiimide compounds having a photo-alignable unit described in JP2002-265541A and JP2002-317013A, the photo-crosslinkable silane derivatives described in JP4205195B and JP4205198B, the photo-crosslinkable polyimide, polyamide, or ester described in JP2003-520878A, JP2004-529220A, and JP4162850B, the photo-dimerizable compounds, particularly, the cinnamate compound, chalcone compound, and coumarin compound described in JP1997-118717A (JP-H09-118717A), JP1998-506420A (JP-H10-506420A), JP2003-505561A, WO2010/150748A, JP2013-177561A, and JP2014-12823A, and the like. Among these, an azo compound, a photo-crosslinkable polyimide, a polyamide, an ester, a cinnamate compound, and a chalcone compound are particularly preferable.

The first retardation layer may have a configuration in which all the liquid crystal compound molecules tilt in the thickness direction or a configuration in which at least some of the liquid crystal compound molecules form a tilt alignment in the thickness direction. In the present invention, a configuration is desirable in which all the liquid crystal compound molecules tilt.

For example, as the configuration in which some of the liquid crystal compound molecules form a tilt alignment, the liquid crystal compound in the first retardation layer may be fixed in the so-called hybrid alignment state. In the hybrid alignment, the angle between the major axis of the liquid crystal compound and the layer surface increases or decreases in the depth direction of the layer, as the distance from the alignment film surface increases. The angle preferably decreases as the distance increases. Furthermore, the change in angle can be a continuous increase, a continuous decrease, an intermittent increase, an intermittent decrease, a change including a continuous increase and a continuous decrease, or an intermittent change including increase and decrease. The intermittent change includes a region where the angle does not change in the middle of the thickness direction. In the present specification, "hybrid alignment" includes an alignment state where the overall angle increases or decreases even though the alignment includes a region where the angle does not change. A hybrid alignment is preferable in which the angle continuously changes.

The retardation layer prepared by forming a hybrid alignment of a liquid crystal compound and fixing the alignment state also has polar angle dependence of retardation that has asymmetry about the normal direction (polar angle: 0°) with respect to the incident light hitting at least one incident surface including the normal of the layer surface.

—Liquid Crystal Compound—

Examples of liquid crystal compounds that can be used for preparing the first retardation layer include both the rod-like liquid crystal compound and discotic liquid crystal compound.

As the rod-like liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohcxylbenzonitriles are preferably used. Fixing of these rod-like liquid crystal compounds are performed by introducing a polymerizable group into the terminal structure of the rod-like liquid crystal compounds (just as the discotic liquid crystals that will be described later) and exploiting the polymerization and curing reaction of the polymerizable group. Specifically, for example, JP2006-209073A describes a case where a polymerizable nematic rod-like liquid crystal compound is cured with ultraviolet rays. Not only the low-molecular-weight liquid crystal compound described above, but also a polymer liquid crystal compound can be used. The polymer liquid crystal compound is a polymer having a side chain corresponding to the aforementioned low-molecular-weight liquid crystal compound. An optical compensation sheet formed of a polymer liquid crystal compound is described in JP1993-53016A (JP-H05-53016A) and the like.

Examples of discotic liquid crystal compounds that can be used for preparing the first retardation layer include benzene derivatives described in the research report by C. Destrade et al., Mol. Cryst. Vol. 71, p. 111 (1981), truxene derivatives described in C. Destrade et al., Mol. Cryst. Vol. 12, p. 141 (1985), Physicslett, A, Vol. 78, p. 82 (1990), cyclohexane derivatives described in the research report by B. Kohne et al., Angew. Chem., Vol. 96, p. 70 (1984), and macrocycles based on azacrown or phenylacetylene described in the research report by J. M. Lehn et al., J. Chem. Commun., p. 1794 (1985), the research report by J. Zhang et al., and J. Am. Chem. Soc. Vol. 116, p. 2655 (1994).

The molecule of the discotic liquid crystal compound includes a liquid crystalline compound having a structure in which a mother nucleus at the center of molecule is substituted with a linear alkyl or alkoxy group or a substituted benzoyloxy group as a side chain of the mother nucleus in the form of radial lines. The discotic liquid crystal compound is preferably a compound in which molecules or a group of molecules has rotation symmetry so that a certain alignment can be formed. The retardation layer formed of the composition containing a discotic liquid crystal compound does not need to exhibit liquid crystallinity in a state where the retardation layer is finally incorporated into the optical filter. For example, in a case where low-molecular-weight discotic liquid crystal molecules having a group reactive to heat or light are subjected to a polymerization reaction or the like by heating or light irradiation so that the molecular weight thereof increases, the molecules lose liquid crystallinity. It goes without saying that a retardation layer containing a compound having a molecular weight increased in this way can be used in the present invention. Preferable examples of the discotic liquid crystal compound include the compounds described in JP1996-50206A (JP-H08-50206A). Furthermore, JP1996-27284A (JP-H08-27284A) describes the polymerization of discotic liquid crystal molecules.

In order to fix discotic liquid crystal molecules by polymerization, it is necessary to bond a polymerizable group as a substituent to the discotic core of the discotic liquid crystal molecules. It is preferable that the discotic core and the polymerizable group are compounds bonded via a linking group. In a case where such compounds are used, the alignment state can be maintained even in a polymerization reaction. Examples thereof include the compounds described in paragraphs [0151] to [0168] of JP2000-155216A, and the like.

In forming the first retardation layer, additives, such as a plasticizer, a surfactant, and a polymerizable monomer, may be used in combination with the liquid crystal compound. These additives may be added for various purposes such as improving the uniformity of the coating film, the film hardness, and the aligning properties of liquid crystal molecules.

Examples of the polymerizable monomer include radically polymerizable or cationically polymerizable compounds. Among these, a polyfunctional radically polymerizable monomer is preferable which is copolymerizable with the aforementioned liquid crystal compound containing a polymerizable group. Examples thereof include the compounds described in paragraphs [0018] to [0020] of JP2002-296423A. The amount of this compound added with respect to the liquid crystal compound is generally in a range of 1% to 50% by mass, and preferably in a range of 5% to 30% by mass.

Examples of the surfactant include the compounds known in the related art. Particularly, a fluorine-based compound is preferable. Specifically, examples thereof include the compounds described in paragraphs [0028] to [0056] of JP2001-330725A.

Examples of polymers that can be used include a cellulose ester. Preferable examples of the cellulose ester include those described in paragraph [0178] of JP2000-155216A. The amount of the polymer added with respect to the liquid crystal molecules is preferably in a range of 0.1% to 10% by mass, and more preferably in a range of 0.1% to 8% by mass, because the alignment of the liquid crystal molecules is not hindered in this range.

The discotic nematic liquid crystal phase-solid phase transition temperature of the discotic liquid crystal molecule is preferably 70° C. to 300° C., and more preferably 70° C. to 170° C.

The first retardation layer can be formed by coating a surface, preferably a surface of an alignment film, with a coating liquid that contains liquid crystal molecules and, if necessary, a polymerizable initiator which will be described later and optional components.

As a solvent to be used for preparing the coating liquid, an organic solvent is preferably used. Examples of the organic solvent include an amide (for example, N,N-dimethylformamide), a sulfoxide (for example, dimethyl sulfoxide), a heterocyclic compound (for example, pyridine), a hydrocarbon (for example, benzene or hexane), an alkyl halide (for example, chloroform, dichloromethane, or tetrachloroethane), an ester (for example, methyl acetate or butyl acetate), a ketone (for example, acetone or methyl ethyl ketone), and an ether (for example, tetrahydrofuran or 1,2-dimethoxyethane). Among these, an alkyl halide and a ketone are preferable. Two or more kinds of organic solvents may be used in combination.

The coating with a coating liquid can be performed by the method known in the related art. For example, what will be described regarding the above-described alignment film can be referred to.

The thickness of the first retardation layer is preferably 0.1 μm to 20 μm, more preferably 0.5 μm to 15 μm, and even more preferably 1 μm to 10 μm.

The in-plane retardation of the first retardation layer is preferably 30 nm to 300 nm, more preferably 50 nm to 200 nm, and even more preferably 75 nm to 150 nm.

The aligned liquid crystal molecules can be fixed while maintaining the alignment state. It is preferable that the alignment state be fixed by a polymerization reaction. The polymerization reaction includes a thermal polymerization reaction using a thermal polymerization initiator and a photopolymerization reaction using a photopolymerization initiator. Particularly, a photopolymerization reaction is preferable.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of triarylimidazole dimer and p-aminophenylketone (described in U.S. Pat. No. 3,549,367A), acrydine and phenazine compounds (described in JP1985-105667A (JP-S60-105667A) and U.S. Pat. No. 4,239,850A), an oxadiazole compound (described in U.S. Pat. No. 4,212,970A), and the like.

The amount of the photopolymerization initiator used is preferably in a range of 0.01% to 20% by mass of the solid content of the coating liquid, and more preferably in a range of 0.5% to 5% by mass of the solid content of the coating liquid.

It is preferable to use ultraviolet rays for polymerizing the liquid crystal molecules by light irradiation.

The irradiation energy is preferably in a range of 20 mi/cm$^2$ to 50 J/cm$^2$, more preferably in a range of 20 to 5,000 mJ/cm$^2$, and even more preferably in a range of 100 to 800 mi/cm$^2$. Furthermore, in order to accelerate the photopolymerization reaction, the light irradiation may be performed under heating conditions.

The first retardation layer is preferably a layer formed by aligning a curable liquid crystal composition in a desired state and then curing the composition. For example, it is possible to prepare the first retardation layer by coating an alignment treatment surface of an alignment film with polymerizable liquid crystals, aligning the liquid crystals along the direction of the alignment treatment (rubbing axis, polarization direction during irradiation with polarized light, or irradiation angle during irradiation with non-polarized light), and fixing the alignment state. For example, the first retardation layer may be a retardation layer formed by establishing a uniform tilt alignment of rod-like liquid crystal molecules and fixing the alignment state. In the tilt alignment, the angle between the major axis of the rod-like liquid crystal molecules and the layer surface is larger than 0° and smaller than 90°. Another example of the first retardation layer is a retardation layer formed by fixing a hybrid alignment. In the hybrid alignment, the angle between the major axis of the rod-like liquid crystal molecules and the layer surface increases or decreases in the depth direction of the layer, as the distance from the alignment film surface increases. The angle preferably decreases as the distance increases. Furthermore, the change in angle can be a continuous increase, a continuous decrease, an intermittent increase, an intermittent decrease, a change including a continuous increase and a continuous decrease, or an intermittent change including increase and decrease. The intermittent change includes a region where the angle does not change in the middle of the thickness direction. In the present specification, "hybrid alignment" includes an alignment state where the overall angle increases or decreases even though the alignment includes a region where the angle does not change. A hybrid alignment is preferable in which the angle continuously changes.

Usually, the average major axis direction of the liquid crystal molecules in the retardation layer can be adjusted by selecting the material of liquid crystals or alignment film used for forming the retardation layer, selecting the conditions of the rubbing treatment method, the polarization direction of polarized light radiated on a photo-alignment film, or the irradiation angle of non-polarized light. Furthermore, usually, the major axis (disc plane) direction of the liquid crystal molecules on the surface side (air side) of the retardation layer can be adjusted by selecting the type of additive (such as a plasticizer, a surfactant, a polymerizable monomer, or a polymer) to be used together with the liquid crystal molecules for forming the retardation layer. The degree of change in the alignment direction of the major axis can also be adjusted by selecting the liquid crystal molecules and the additive in the same manner as described above.

As described above, the first retardation layer is preferably a film in which the main axis of the refractive index ellipsoid is in a direction at an average tilt angle of θt with respect to the layer surface (here, θt satisfies 0°<θt<90°), that is, a film in which the main axis tilts in the thickness direction of the layer.

The average tilt angle θt of the main axis of the first retardation layer with respect to the layer surface can be determined using a crystal rotation method. In an optically anisotropic film having a hybrid alignment, the directors of liquid crystal molecules are oriented at different angles at all positions in the thickness direction of the layer. Therefore, in a case where an optically anisotropic film is regarded as a structure, the film has no optic axis.

The error allowed in the following measurement method will also be allowed for the average tilt angle θt of the main axis of the first retardation layer used in the present invention. θt is measured at a wavelength of 550 nm.

In addition, the variation in the average tilt angle θt of the main axis can be measured by the following method.

Ten points in one in-plane direction of the first retardation layer and 10 points in a direction orthogonal to the aforementioned one direction are sampled at equal intervals, and the average tilt angle θt of the main axis is measured by the method described above. The difference between the largest θt and the smallest θt can be adopted as the variation in the average tilt angle of the main axis.

The slow axis angle can be determined by measuring Re. The variation in the slow axis angle can be determined by measuring Re at 10 points in one in-plane direction of the first retardation layer and 10 points in a direction orthogonal to the aforementioned one direction at equal intervals, and calculating the difference between the largest Re and the smallest Re.

<Second Retardation Layer>

The second retardation layer may be a retardation film known in the related art, or a retardation layer having polar angle dependence of retardation that has symmetry about the normal direction with respect to the incident light hitting at least one incident surface including the normal of the layer surface, just as the first retardation layer.

The in-plane retardation of the second retardation layer is preferably 30 nm to 300 nm, more preferably 80 nm to 250 nm, and even more preferably 100 nm to 160 nm.

The thickness of the second retardation layer is preferably 0.1 μm to 500 μm, more preferably 0.5 μm to 300 μm, and even more preferably 1 μm to 200 μm.

<Optical Device>

The optical filter according to an embodiment of the present invention is not limited to the head-mounted display described above, and can be used in various optical devices.

For example, in a case where the optical filter is disposed on the entire surface of an image display apparatus, such as a liquid crystal display or an organic EL display, the optical filter can prevent the apparatus from being peeped by others. In addition, the optical filter can improve bright room contrast by significantly reduce the incidence of external light such as illumination light or sunlight.

EXAMPLES

Hereinafter, the present invention will be more specifically described with reference to examples. The materials, reagents, amounts of substances and ratios thereof, operations, and the like described in the following examples can be appropriately changed as long as they do not depart from the gist of the present invention. Therefore, the scope of the present invention is not limited to the following specific examples.

<Preparation of Alignment Film>

(1) Preparation of Alignment Film 1

As a transparent substrate film, a commercially available cellulose acylate-based film, trade name "FUJITAC TG40UL" (manufactured by FUJIFILM Corporation) was prepared and subjected to a saponification treatment so that the surface thereof was hydrophilized. Then, the surface was coated with the following composition 1 for forming an alignment film by using a #12 bar and dried at 110° C. for 2 minutes, thereby forming an alignment film 1 on the transparent substrate film.

| (Makeup of composition 1 for forming alignment film) | |
|---|---|
| The following modified polyvinyl alcohol | 2.00 parts by mass |
| Water | 74.08 parts by mass |
| Methanol | 23.76 parts by mass |
| Photopolymerization initiator (IRGACURE 2959, manufactured by BASF SE) | 0.06 parts by mass |

(Modified polyvinyl alcohol)

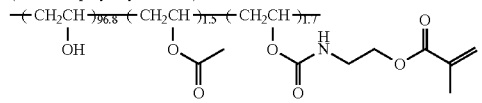

(In the formula, the numerical value attached to a repeating unit represents the molar ratio of each repeating unit.)

Example 1

<Preparation of Anisotropic Absorption Layer>

(1) Preparation of Anisotropic Absorption Layer 1

The obtained alignment film was coated with the following coloring composition 1 by using a bar coater, thereby forming a coating film. The coating film was dried at room temperature for 30 seconds, then heated to 140° C., kept as it was for 30 seconds, and then cooled to room temperature. Thereafter, the coating film was reheated to 80° C., kept as it was for 30 seconds, and then cooled to room temperature. The layer prepared in this way was named anisotropic absorption layer 1.

| (Makeup of coloring composition 1) | |
|---|---|
| Dichroic colorant compound D1 | 10.59 parts by mass |
| Dichroic colorant compound D2 | 8.71 parts by mass |
| Polymer compound P1 | 44.13 parts by mass |
| Interface modifier F1 | 0.80 parts by mass |
| Interface modifier Fe | 0.80 parts by mass |
| Interface modifier F3 | 0.96 parts by mass |
| Tetrahydrofuran | 793.9 parts by mass |
| Cyclopentanone | 140.1 parts by mass |

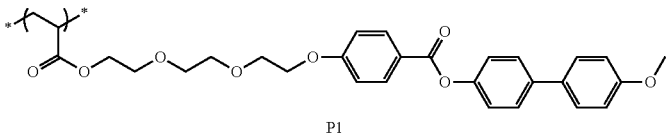

P1

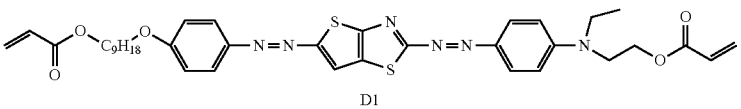

D1

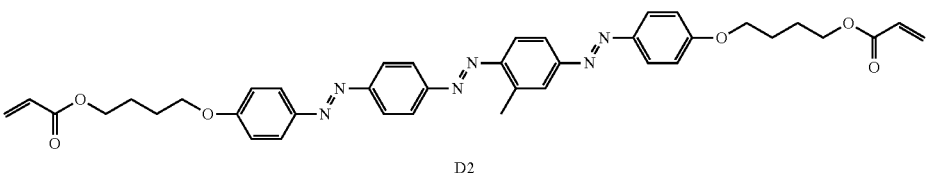 [SMILES: C=CC(=O)OCCCCOc1ccc(/N=N/c2ccc(/N=N/c3ccc(/N=N/c4ccc(OCCCCOC(=O)C=C)cc4)cc3C)cc2)cc1 ; "D2"]

D2

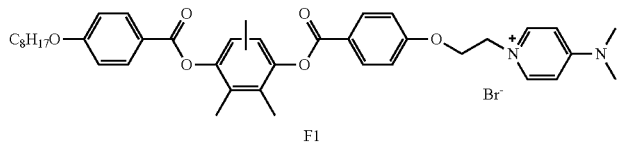

F1

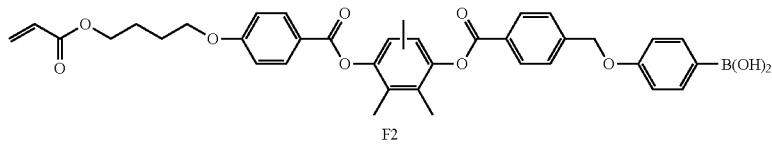

F2

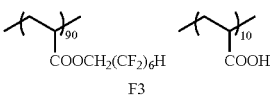

F3

The alignment degree and front transmittance of the anisotropic absorption layer 1 obtained as above were measured. As a result, the alignment degree was 0.96, and the front transmittance was 60%. The film thickness was 2 μm.

<First Retardation Layer>

A retardation layer consisting of a rod-like liquid crystal composition was formed on a glass substrate (EAGLE XG: manufactured by Corning Incorporated) by the following method, thereby preparing a first retardation layer.

—Formation of Alignment Film—

The glass substrate was washed and dried, and coated with a coating liquid for forming an alignment film having the following composition by using a spin coater. The glass substrate was dried on a hot plate at 100° C. for 60 seconds. Then, in the air, by using an air-cooled metal halide lamp at 100 mW/cm$^2$ (manufactured by EYE GRAPHICS CO., LTD.), the glass substrate was irradiated with ultraviolet rays at 2,000 mJ/cm$^2$ at a tilt angle of 45° with respect to the normal direction of the glass substrate, thereby forming a photo-aligned alignment film A.

| Composition of coating liquid for forming alignment film | |
|---|---|
| The following material for photo-alignment | 1 part by mass |
| Water | 16 parts by mass |
| 2-Butoxy ethanol | 42 parts by mass |
| Dipropylene glycol monomethyl ether | 42 parts by mass |

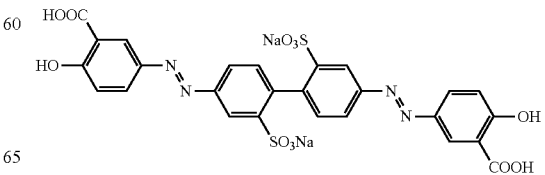

—Formation of Retardation Layer Consisting of Rod-Like Liquid Crystal Composition—

| Composition of coating liquid B for optically anisotropic film | |
|---|---|
| The following liquid crystal compound (RA) | 83 parts by mass |
| The following liquid crystal compound (RB) | 15 parts by mass |
| The following liquid crystal compound (RC) | 2 parts by mass |
| Photopolymerization initiator (IRGACURE 907, manufactured by IGM Resins B.V.) | 3.0 parts by mass |
| Cyclohexanone | 109 parts by mass |
| Methyl ethyl ketone | 653 parts by mass |

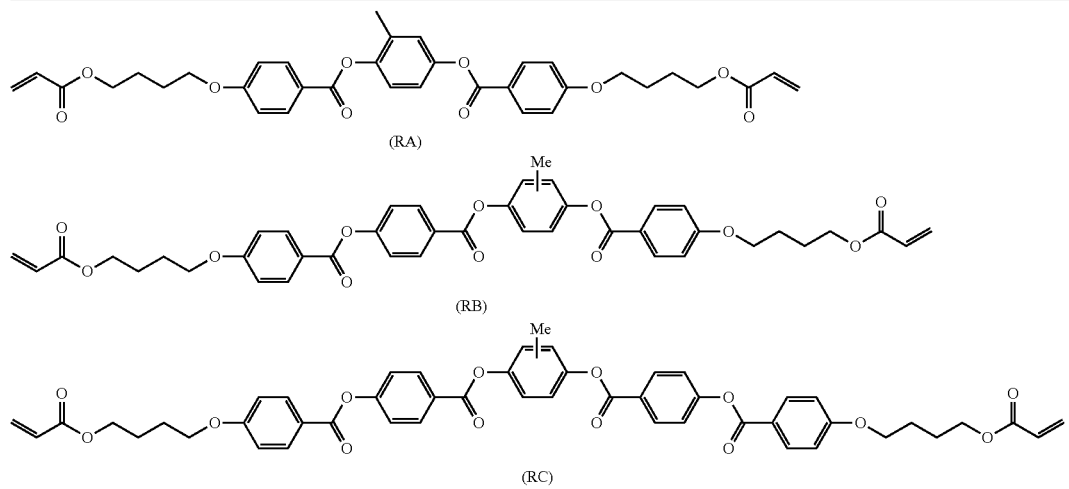

(RA)

(RB)

(RC)

The glass support with surface on which the alignment film A was formed was coated with the coating liquid B for an optically anisotropic film by using a spin coater. Then, the glass support was heated and aged at a film surface temperature of 90° C. for 60 seconds. Thereafter, in nitrogen, by using an air-cooled metal halide lamp at 500 mW/cm² (manufactured by EYE GRAPHICS CO., LTD.), the glass support was irradiated with ultraviolet rays at 500 mJ/cm² so that the alignment state was fixed, thereby forming an optically anisotropic film. In the formed optically anisotropic film, an alignment of a rod-like liquid crystal compound was formed in which the direction parallel to a surface including the normal of the glass substrate and the aspect during the preparation of the alignment film was adopted as a slow axis. The incidence angle dependence of Re and the average tilt angle of the optic axis were measured. As a result, Re at a wavelength of 550 nm was 127 nm, and the average tilt angle of the optic axis was 45°.

<Second Retardation Layer>

A polycarbonate film (trade name: PURE-ACE, manufactured by TEIJIN LIMITED) was heated and stretched so that the value of birefringence index (retardation value) was adjusted, thereby preparing a second retardation layer.

The in-plane retardation Re of the second retardation layer was 135 nm. The retardation Rth in the thickness direction was 68 nm.

The prepared first anisotropic absorption layer, first retardation layer, second retardation layer, and second anisotropic absorption layer were laminated in this order by using a pressure sensitive adhesive (SK-2057, manufactured by Soken Chemical & Engineering Co., Ltd.) so that the directions of slow axes thereof were orthogonal to each other, thereby preparing an optical filter. The first retardation layer and the second retardation layer were laminated so that the slow axes thereof were orthogonal to each other.

Comparative Example 1

An optical filter was prepared in the same manner as in Example 1, except that the first retardation layer was not provided, and the following retardation layer was used as the second retardation layer.

<Second Retardation Layer>

A polycarbonate film (trade name: PURE-ACE, manufactured by TEIJIN LIMITED) was heated and stretched so that the value of birefringence index (retardation value) was adjusted, thereby preparing a second retardation layer.

The in-plane retardation Re of the second retardation layer was 270 nm. The retardation Rth in the thickness direction was 135 nm.

[Evaluation]

Light was caused to incident on the prepared optical filters of Example 1 and Comparative Example 1 from a direction of a polar angle of 60°, and the transmittance of the light was measured at various azimuthal angles. For the measurement, AxoScan manufactured by Axometrics, Inc. was used. The wavelength of the incident light was 550 nm.

[Simulation]

Under the same conditions as in Example 1 and Comparative Example 1 respectively, the transmittance of the incident light from the direction of a polar angle of 60° was measured at various azimuthal angles by simulation. For the simulation, the method of extended Jones matrix was used, and calculation was performed by simplifying for only the optical filter.

Figure 8:
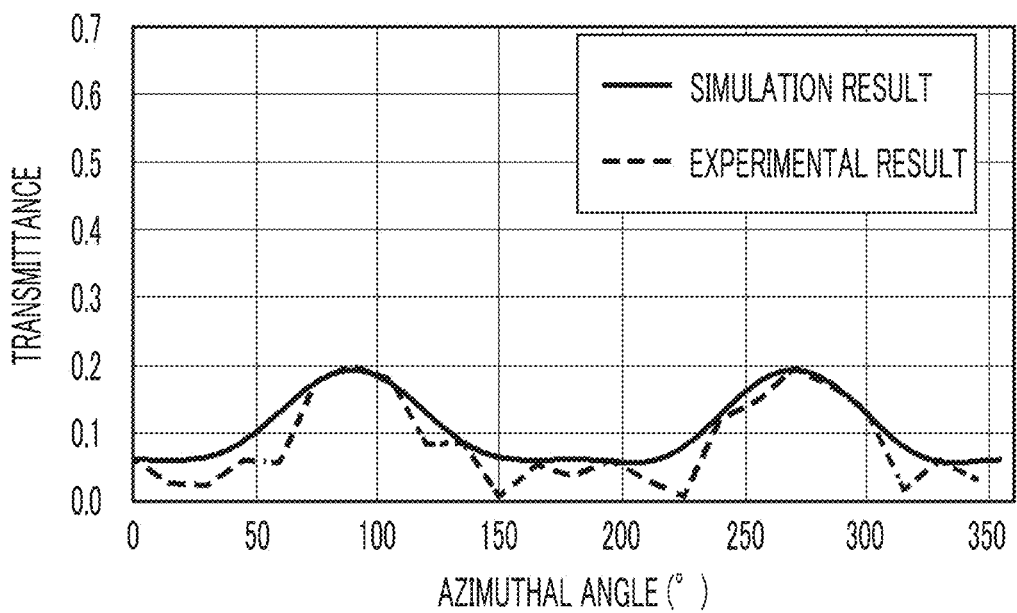
FIG. 8 is a graph showing the relationship between azimuthal angle and transmittance.
Figure 9:
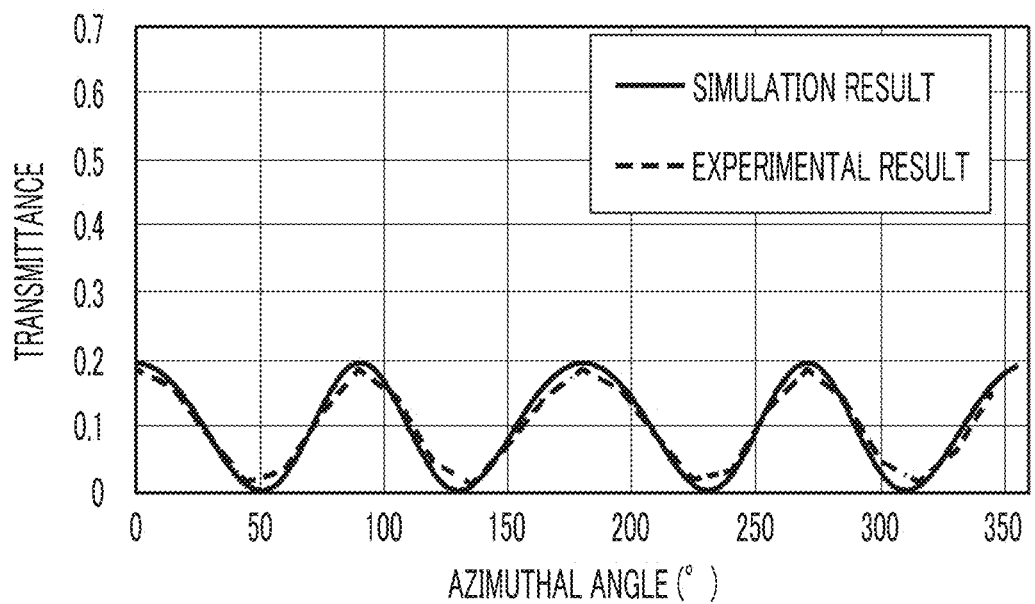
FIG. 9 is a graph showing the relationship between azimuthal angle and transmittance.

FIG. 8 shows the experimental results and simulation results of Example 1. FIG. 9 shows the experimental results and simulation results of Comparative Example 1.

As is evident from FIG. 9, while the optical filter of Comparative Example 1 has a low transmittance in four azimuth directions with respect to the light from an oblique direction of a polar angle of 60° as shown in FIG. 9, the optical filter of Example 1 has a low transmittance in two azimuth directions with respect to the same light as shown in FIG. 8. In a case where the azimuth in which the transmittance decreases is adopted as azimuth including a plane perpendicular to the pitch of the diffraction element, it is possible to ensure the visibility of external light in other azimuths while preventing the reflected glare of diffracted light. In Comparative Example 1, because the optical filter also cuts off oblique light other than the light in azimuth required to be cut off, visibility of external light cannot be ensured.

Furthermore, FIGS. 8 and 9 show that the experimental results and the simulation results are quite consistent with each other. Therefore, in the following examples, the optical filters were evaluated by simulation.

In a state where the back surface of the prepared optical filters of Example 1 and Comparative Example 1 was being irradiated with light, photographs were taken in the front direction and an oblique direction of 60° at azimuths of 0°, 90°, 180°, and 270°. The photographs are shown in FIGS. 14 and 15.

Figure 14:
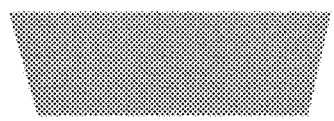
FIG. 14 is photographs taken from various directions by transmitting light through the optical filter according to the embodiment of the present invention.
Figure 14:
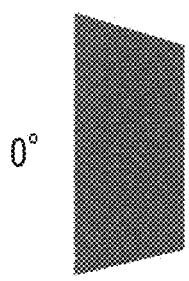
Figure 14:
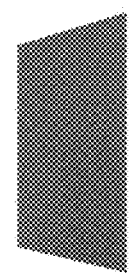
Figure 14:
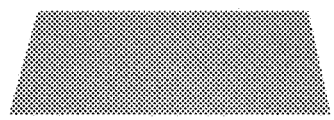
Figure 15:
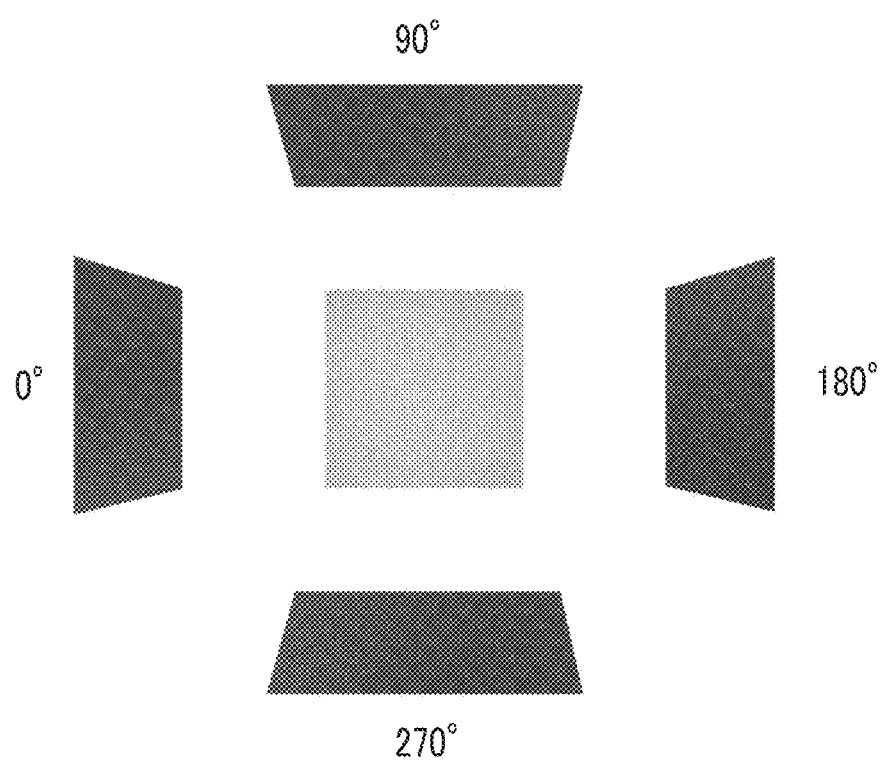
FIG. 15 is photographs taken from various directions by transmitting light through an optical filter of Comparative Example 1.

As is evident from FIG. 14, in Example 1, the photographs taken in the front direction and the oblique direction at azimuths of 90° and 180° appear bright while the photographs taken in the oblique direction at azimuths of 0° and 270° appear dark. As is evident from FIG. 15, in Comparative Example 1, the photographs taken in the front direction appear bright while the photographs taken in the oblique direction at azimuths of 0°, 90°, 180°, and 270° appear dark.

Example 2

The simulation was performed in the same manner as in Example 1, except that the optical filter does not have the second retardation layer, the in-plane retardation Re of the first retardation layer was changed to 115 nm, and the average tilt angle θt of the main axis was changed to 60°.

Figure 10:
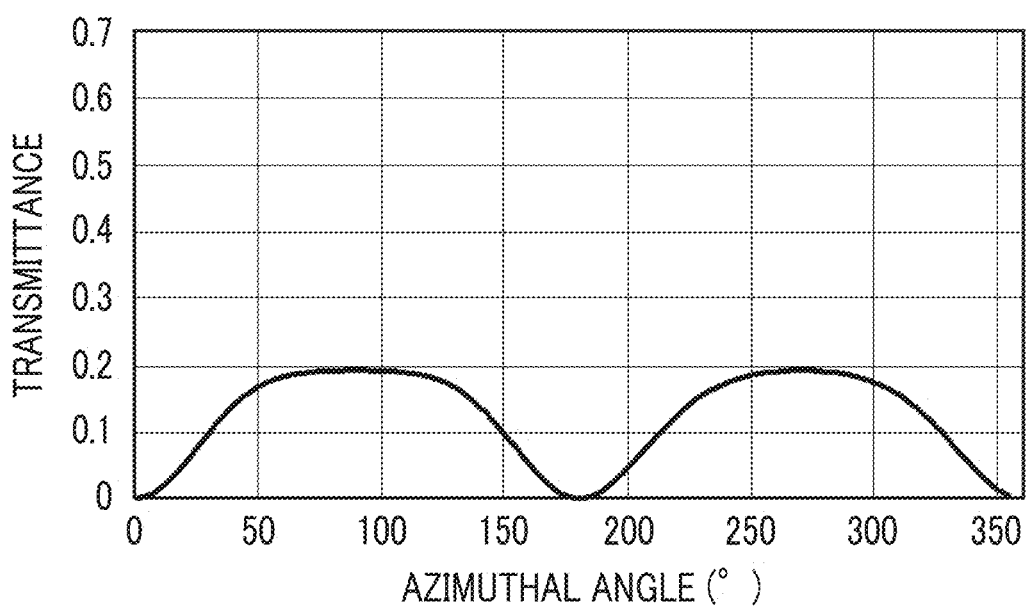
FIG. 10 is a graph showing the relationship between azimuthal angle and transmittance.

The results are shown in FIG. 10.

Example 3

The simulation was performed in the same manner as in Example 2, except that the optical filter had the second retardation layer between the first retardation layer and the second anisotropic absorption layer, the in-plane retardation Re of the second retardation layer was changed to 135 nm, the retardation Rth in the thickness direction was changed to 68 nm, and the slow axes of the first retardation layer and the second retardation layer were orthogonal to each other.

Figure 11:
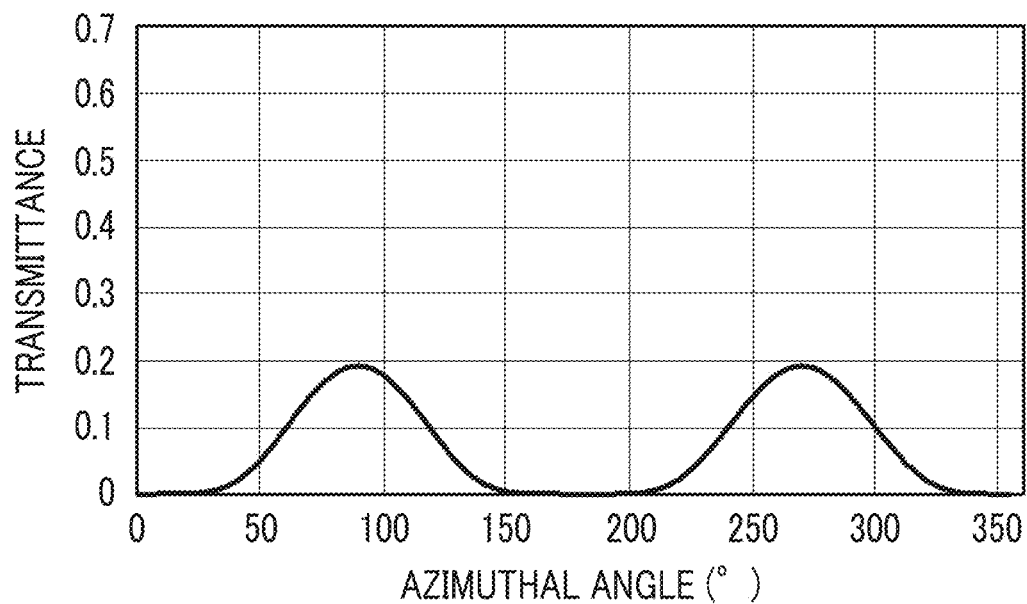
FIG. 11 is a graph showing the relationship between azimuthal angle and transmittance.

The results are shown in FIG. 11.

As is evident from FIG. 10, even though the optical filter does not have the second retardation layer, the optical filter has a low transmittance in two azimuth directions with respect to the light from an oblique direction at a polar angle of 60°, which tells that the optical filter transmits a wider range of light.

Furthermore, the comparison between FIG. 10 and FIG. 11 tells that in a case where the optical filter includes the second retardation layer, the range light to be cut off can be adjusted.

Comparative Example 2

The simulation was performed in the same manner as in Comparative Example 1, except that the in-plane retardation Re of the second retardation layer was changed to 135 nm, 200 nm, 270 nm, 400 nm, and 500 nm.

Figure 12:
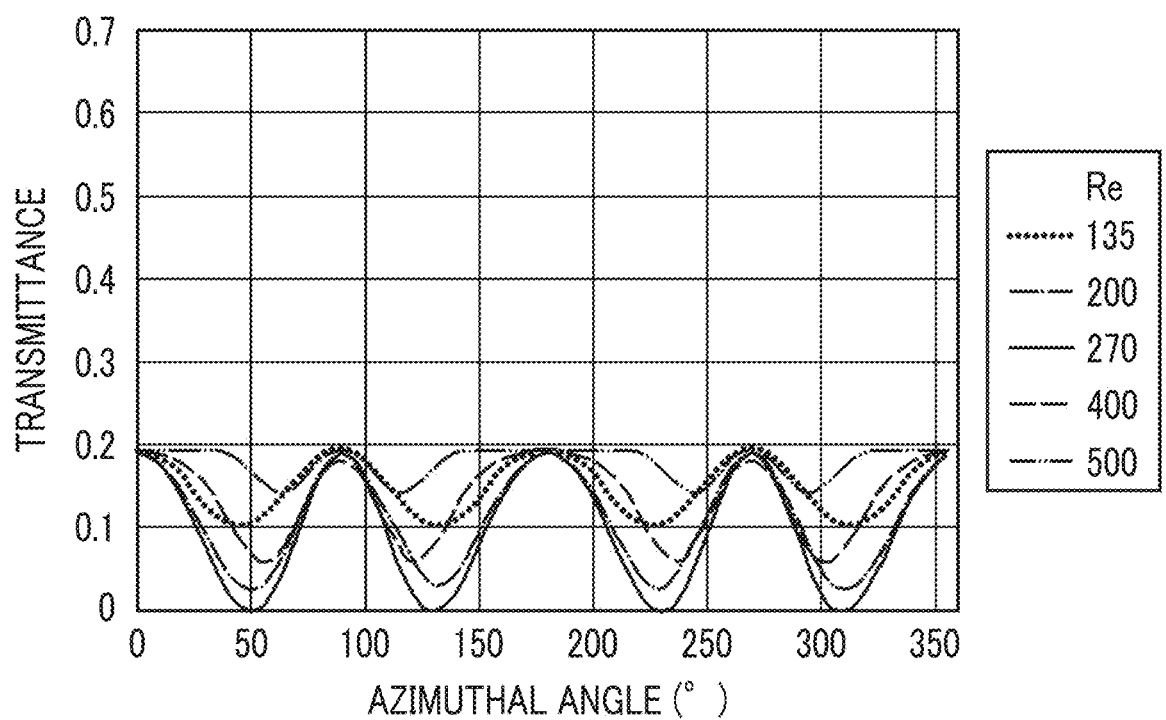
FIG. 12 is a graph showing the relationship between azimuthal angle and transmittance.

The results are shown in FIG. 12.

Example 4

The simulation was performed in the same manner as in Example 2, except that the in-plane retardation of the first retardation layer was changed to 115 nm, and the average tilt angle θt of the main axis of the first retardation layer was changed to 0°, 20°, 40°, 50°, 60°, and 70°.

Figure 13:
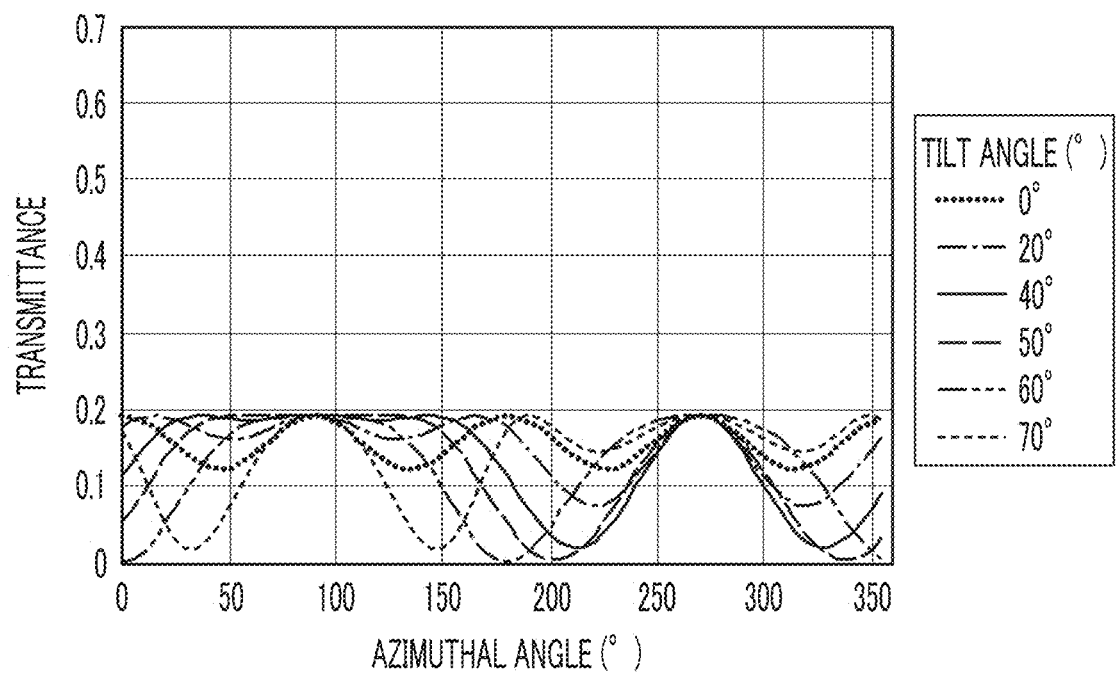
FIG. 13 is a graph showing the relationship between azimuthal angle and transmittance.

The results are shown in FIG. 13.

As is evident from FIG. 12, in a case where an optical filter is configured as in comparative examples in which the retardation layer has polar angle dependence of retardation that does not have asymmetry about the normal direction with respect to the incident light hitting at least one incident surface including the normal of the layer surface, that is, in a case where the slow axis of the retardation layer is parallel to the layer surface, even though the in-plane retardation Re is changed, only the transmittance of the light from an oblique direction is changed, and the optical filter still has a low transmittance in four azimuth directions.

As is evident from FIG. 13, in a case where the main axis of the first retardation layer is at 0° (comparative examples), the optical filter has a low transmittance in four azimuth directions with respect to the light from an oblique direction; however, in a case where the main axis of the first retardation layer tilts, the optical filter has a low transmittance in two azimuth directions with respect to the light from an oblique direction.

Furthermore, FIG. 13 shows that it is preferable that the in-plane retardation of the first retardation layer be 115 nm, because then the optical filter has a lower transmittance in two azimuth directions at an average tilt angle θt of 60° of the main axis of the first retardation layer and has a higher transmittance in other azimuth directions.

The above results clearly show the effects of the present invention.

EXPLANATION OF REFERENCES

10: Optical filter
12: First anisotropic absorption layer
14: First retardation layer
15: Second retardation layer
16: Second anisotropic absorption layer
18, 22: Dichroic colorant
20: Liquid crystal compound
80: Head-mounted display
82: Light guide plate
90: Incident diffraction element
92: Exit diffraction element
100: Optical filter
114: Retardation layer
120: Liquid crystal compound
$I_0$: Front light
$I_1$: Image light
$I_s$: Oblique light
θ: Average tilt angle

What is claimed is:
1. An optical filter comprising, in the following order:
a first anisotropic absorption layer;
a first retardation layer; and
a second anisotropic absorption layer, wherein each of the first anisotropic absorption layer and the second anisotropic absorption layer contains a dichroic colorant,
an absorption axis of the dichroic colorant is perpendicular to a main surface, and
the first retardation layer has polar angle dependence of retardation that has asymmetry about a normal direction with respect to incident light hitting at least one incident surface including a normal of a layer surface of the first retardation layer.

2. The optical filter according to claim 1,
wherein the first retardation layer is a film in which a main axis of a refractive index ellipsoid tilts in a thickness direction, and
an average tilt angle of the refractive index ellipsoid is 5° to 85° with respect to a main surface of the first anisotropic absorption layer.

3. The optical filter according to claim 2, further comprising:
a second retardation layer between the first retardation layer and the second anisotropic absorption layer.

4. The optical filter according to claim 2,
wherein the first retardation layer is formed of a polymerizable liquid crystal composition.

5. The optical filter according to claim 4,
wherein the polymerizable liquid crystal composition contains a polymerizable rod-like liquid crystal compound.

6. The optical filter according to claim 2,
wherein at least one of the first anisotropic absorption layer or the second anisotropic absorption layer is obtained by vertically aligning the dichroic colorant in a liquid crystal layer formed of a liquid crystal compound that is vertically aligned.

7. The optical filter according to claim 6,
wherein an alignment state of the liquid crystal layer is fixed.

8. An optical device comprising:
the optical filter according to claim 2.

9. A head-mounted display comprising:
the optical filter according to claim 2;
a light guide plate;
a diffraction element; and
an image display element.

10. The optical filter according to claim 1, further comprising:
a second retardation layer between the first retardation layer and the second anisotropic absorption layer.

11. The optical filter according to claim 10,
wherein the first retardation layer is formed of a polymerizable liquid crystal composition.

12. The optical filter according to claim 11,
wherein the polymerizable liquid crystal composition contains a polymerizable rod-li liquid crystal compound.

13. The optical filter according to claim 1,
wherein the first retardation layer is formed of a polymerizable liquid crystal composition.

14. The optical filter according to claim 13,
wherein the polymerizable liquid crystal composition contains a polymerizable rod-like liquid crystal compound.

15. The optical filter according to claim 1,
wherein at least one of the first anisotropic absorption layer or the second anisotropic absorption layer is obtained by vertically aligning the dichroic colorant in a liquid crystal layer formed of a liquid crystal compound that is vertically aligned.

16. The optical filter according to claim 15,
wherein an alignment state of the liquid crystal layer is fixed.

17. An optical device comprising:
the optical filter according to claim 1.

18. A head-mounted display comprising:
the optical filter according to claim 1;
a light guide plate;
a diffraction element; and
an image display element.

19. The optical filter according to claim 2,
wherein at least one of the first anisotropic absorption layer or the second anisotropic absorption layer is obtained by vertically aligning the dichroic colorant in a liquid crystal layer formed of a liquid crystal compound that is vertically aligned.

20. The optical filter according to claim 19,
wherein an alignment state of the liquid crystal layer is fixed.

* * * * *